(12) United States Patent
Yumiki

(10) Patent No.: US 8,411,191 B2
(45) Date of Patent: Apr. 2, 2013

(54) DISPLAY CONTROL DEVICE, IMAGING DEVICE, AND PRINTING DEVICE

(75) Inventor: Naoto Yumiki, Osaka (JP)

(73) Assignee: Panasonic Corporation, Osaka (JP)

( * ) Notice: Subject to any disclaimer, the term of this patent is extended or adjusted under 35 U.S.C. 154(b) by 344 days.

(21) Appl. No.: 12/919,754

(22) PCT Filed: Mar. 31, 2009

(86) PCT No.: PCT/JP2009/001487
§ 371 (c)(1),
(2), (4) Date: Aug. 26, 2010

(87) PCT Pub. No.: WO2009/122720
PCT Pub. Date: Oct. 8, 2009

(65) Prior Publication Data
US 2010/0328470 A1 Dec. 30, 2010

(30) Foreign Application Priority Data
Apr. 2, 2008 (JP) ................................. 2008-096594

(51) Int. Cl.
*H04N 5/222* (2006.01)
(52) U.S. Cl. .................................. 348/333.05
(58) Field of Classification Search ............... 348/208.2, 348/208.4, 208.11, 231.99, 333.05, 333.01
See application file for complete search history.

(56) References Cited

U.S. PATENT DOCUMENTS

| | | | |
|---|---|---|---|
| 5,548,409 A | 8/1996 | Ohta et al. | |
| 7,911,511 B2 * | 3/2011 | Yoshikawa et al. | 348/231.99 |
| 2002/0030665 A1 | 3/2002 | Ano | |
| 2009/0102931 A1 | 4/2009 | Yoshikawa et al. | |

FOREIGN PATENT DOCUMENTS

| | | |
|---|---|---|
| JP | H06-303562 A | 10/1994 |
| JP | H09-293141 A | 11/1997 |
| JP | H10-097632 A | 4/1998 |
| JP | 2001-045354 A | 2/2001 |
| JP | 2002-157077 A | 5/2002 |
| JP | 2005-203845 A | 7/2005 |
| JP | 2005-229236 A | 8/2005 |
| JP | 2010-148113 A | 7/2010 |
| WO | WO-2006/126309 A1 | 11/2006 |

OTHER PUBLICATIONS

Notice of Allowance issued in corresponding Japanese Patent Application No. 2010-505395, dated Jun. 19, 2012.

* cited by examiner

*Primary Examiner* — Aung S Moe
(74) *Attorney, Agent, or Firm* — Shinjyu Global IP

(57) ABSTRACT

A digital camera (1) has an image recorder (12), a microcomputer (3), and an image display controller (13). The image recorder (12) is configured to record a moving picture formed from a plurality of still pictures, along with a panning mode signal (60) related to the panning of the digital camera (1). The microcomputer (3) is configured to produce a plurality of extracted images from the moving picture recorded by the image recorder (12), and configured to determine the disposition of the plurality of extracted images on the basis of the panning mode signal (60) recorded by the image recorder (12). The image display controller (13) is configured to display at least two of the plurality of the extracted images side by side on a display section (55) on the basis of the determination result of the microcomputer (3).

20 Claims, 33 Drawing Sheets

| Vertical (y) direction panning | Horizontal (x) direction panning | Panning mode signal |
|---|---|---|
| none | none | 0 |
| | to the left | 1 |
| | to the right | 2 |
| upward | none | 3 |
| | to the left | 4 |
| | to the right | 5 |
| downward | none | 6 |
| | to the left | 7 |
| | to the right | 8 |

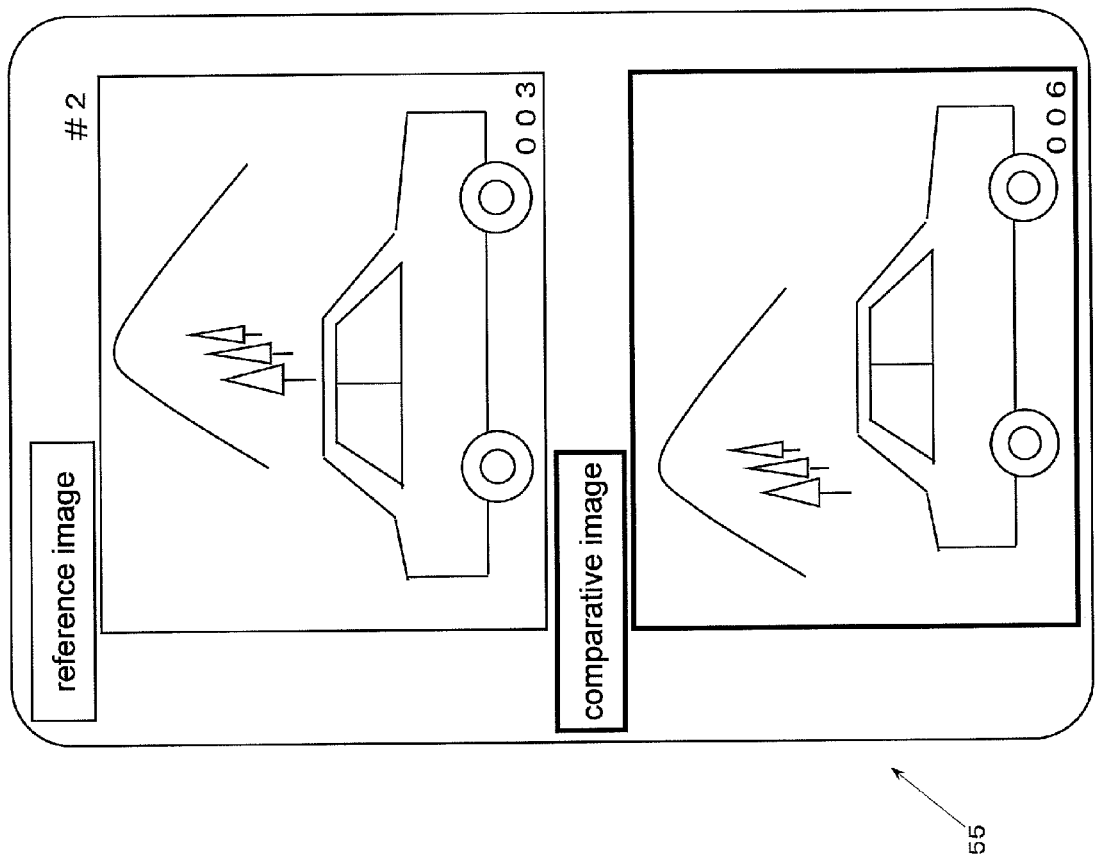

DISPLAY CONTROL DEVICE, IMAGING DEVICE, AND PRINTING DEVICE

CROSS-REFERENCE TO RELATED APPLICATIONS

This U.S. National stage application claims priority under 35 U.S.C. §119(a) to Japanese Patent Application No. 2008-096594 filed in Japan on Apr. 2, 2008, the entire contents of which are hereby incorporated herein by reference.

TECHNICAL FIELD

The technical field relates to a display control device with which a plurality of images can be displayed side by side.

BACKGROUND ART

Recent years have seen CCDs (charge coupled devices), CMOSs (complementary metal-oxide semiconductors), and other such image sensors and signal processors become more highly integrated while dropping in price. Accordingly, imaging devices capable of converting an optical image of a subject into an electrical image signal and outputting this signal have rapidly gained popularity. Examples of such imaging devices include digital still cameras and digital video cameras (hereinafter referred to simply as digital cameras). In particular, imaging devices that combine the functions of both still picture imaging and moving picture imaging are becoming mainstream.

One of the main functions of these digital cameras is to produce a plurality of still pictures from a captured moving picture. Ways of producing a plurality of still pictures include a method in which moving picture imaging is temporarily halted and still picture imaging is performed (when still picture imaging is to be performed in the midst of moving picture imaging), and a method in which one image frame is selected from a moving picture captured after moving picture imaging, and a still picture is produced from the selected image frame.

With conventional digital cameras, a method has been proposed in which a still picture is automatically produced from a captured moving picture (see Patent Citation 1, for example).

Move digital cameras have a small display device installed in them, and have a function of displaying images one at a time, or a function of displaying a plurality of images (hereinafter referred to as thumbnail display). A method in which image display is performed according to the orientation of the digital camera during imaging, for example, has been proposed as a more convenient display method (see Patent Citation 2, for example).

Also, with devices for producing a single panoramic image by splicing together a plurality of images, digital cameras have been proposed with which the progress of this imaging can be checked (see Patent Citation 3, for example).

Patent Citation 1: Japanese Laid-Open Patent Application 2005-229236
Patent Citation 2: Japanese Laid-Open Patent Application 2001-45354
Patent Citation 3: Japanese Laid-Open Patent Application H6-303562

SUMMARY

When a moving subject such as a car or airplane is imaged, the user captures the image while moving the digital camera horizontally, vertically, or at an angle. Thus changing the orientation of the digital camera is called panning. When a thumbnail display is made from still pictures produced from a moving picture captured by panning (hereinafter referred to as panning images), conventionally the images are displayed in the order in which they were captured.

However, when displaying still pictures produced from a moving picture, with a conventional thumbnail display the direction in which the panning images are lined up does not necessarily coincide with the direction in which the digital camera was moved or the direction in which the subject was moving at the time of capture, so this can cause some confusion on the part of the user with respect to these still pictures.

This is not limited to imaging devices, but is also applicable to when images are printed out with a printing device.

It is an object of the present invention to provide a display control device, an imaging device, and a printing device with which there is less confusion with respect to a plurality of images displayed side by side.

A display control device according to a first aspect is a display control device for displaying on a display section an image acquired by an image acquisition section, and the display control device includes a recording section, a movement information production section, an extracted image production section, a disposition determination section, and an image display controller. The recording section is configured to record a moving picture formed by a plurality of still pictures continuously acquired by the image acquisition section. The movement information production section is configured to produce first movement information related to movement of a subject in the moving picture, on the basis of the moving picture recorded to the recording section. The extracted image production section is configured to produce a plurality of extracted images from the plurality of still pictures forming the moving picture. The disposition determination section is configured to determine the disposition of the plurality of extracted images on the basis of the first movement information. The image display controller is configured to display at least two of the plurality of extracted images side by side on the display section on the basis of the determination result of the disposition determination section.

With this display control device, a plurality of extracted images are produced from a moving image by the extracted image production section, and the disposition of the plurality of extracted images is determined by the disposition determination section on the basis of the first movement information produced from the moving image. Accordingly, the disposition of the extracted images can be adjusted according to the movement of the subject in the moving image. Consequently, the direction of movement of the subject can be made to coincide substantially with the direction in which the extracted images are disposed, which reduces confusion with respect to the plurality of images displayed side by side.

A device in which the display control device is installed here can be a digital video camera, a digital still camera, a digital single lens reflex camera, a portable telephone equipped with a camera function, a PDA (personal digital assistant) equipped with a camera function, a PC (personal computer) equipped with a camera function, a DVD (digital video disk) recorder, or a hard disk recorder. The image acquisition section includes, for example, a sensor (CCD or CMOS) that produces an image signal by opto-electric conversion.

A display control device according to a second aspect is the device according to the first aspect, wherein the movement information production section is configured to produce the first movement information on the basis of a plurality of extracted images extracted from the moving picture.

A display control device according to a third aspect is the device according to the first or second aspect, wherein the disposition determination section is configured to determine the disposition of the plurality of extracted images so that the orientation of the time vector formed by two adjacent extracted images will substantially coincide with one component of the direction of movement included in the first movement information.

The term "time vector" here means a vector extending from the center of a previously acquired still picture toward the center of a subsequently acquired still picture when two still pictures acquired at different times are put side by side. The phrase "the orientation of the time vector will substantially coincide with one component of the direction of movement" encompasses both a case in which the orientation of the time vector perfectly coincides with one component of the direction of movement, as well as a case in which the orientation of the time vector deviates from one component of the direction of movement to an extent that the effect of reducing confusion regarding the displayed still pictures can still be ensured.

A display control device according to a fourth aspect is the device according to any of the first to third aspects, wherein the recording section is capable of recording second movement information related to the movement direction of the housing during acquisition of the moving picture, along with the moving picture, and the movement information production section produces the first movement information by utilizing the second movement information.

An imaging device according to the fifth aspect includes a housing, an optical system, an image acquisition section, a display section, a movement detector, and the display control device according to any of the first to fourth aspects. The optical system is supported by the housing, and is configured to form an optical image of a subject. The image acquisition section is configured to convert an optical image formed by the optical system into an electrical image signal, and is configured to acquire an image of the subject. The display section is configured to display side by side a plurality of images acquired by the image acquisition section.

Here, the imaging device is, for example, a device capable of capturing moving pictures and still pictures, or a device capable of capturing just moving pictures. Examples of imaging devices include digital video cameras, digital still cameras, and digital single lens reflex cameras. Other examples of imaging devices include portable telephones equipped with a camera function, PDAs (personal digital assistants) equipped with a camera function, and PCs (personal computers) equipped with a camera function.

An imaging device according to a sixth aspect is the device according to the fifth aspect, further comprising an orientation detector configured to acquire orientation information related to the orientation of the housing. The orientation information is recorded along with the image to the recording section. The image display controller is configured to adjust the display state of the image with respect to the display section so that in a state in which the image is displayed on the display section, the top-bottom direction in the image substantially coincides with the vertical direction.

An imaging device according to a seventh aspect is the device according to the sixth aspect, further comprising a blur correction device configured to suppress deterioration of an image caused by movement of the housing. The blur correction device has a correcting lens included in the optical system, a drive frame supporting the correcting lens movably in a first direction that is perpendicular to the optical axis of the correcting lens and a second direction that is perpendicular to the first direction and the optical axis, a first actuator configured to drive the correcting lens in the first direction, and a second actuator configured to drive the correcting lens in the second direction. The orientation detector is configured to detect the orientation of the housing on the basis of the drive force of the first actuator and second actuator.

An imaging device according to a eighth aspect is the device according to any of the fifth to seventh aspects, further comprising a recording controller configured to associate mutually and configured to record the plurality of extracted images selected from the moving picture.

A printing device according to an ninth aspect comprises the display control device according to any of the first to fourth aspects, and a printing section configured to print an image displayed on the display section.

The printing device here is, for example, a device that can print an image on paper.

BRIEF DESCRIPTION OF DRAWINGS

FIG. 5 is a table of panning mode signals.

FIG. 33 is a display example of a reference image and a comparative image (other embodiment).

DETAILED DESCRIPTION OF THE EMBODIMENTS

First Embodiment

Overall Configuration of Digital Camera

Figure 1:
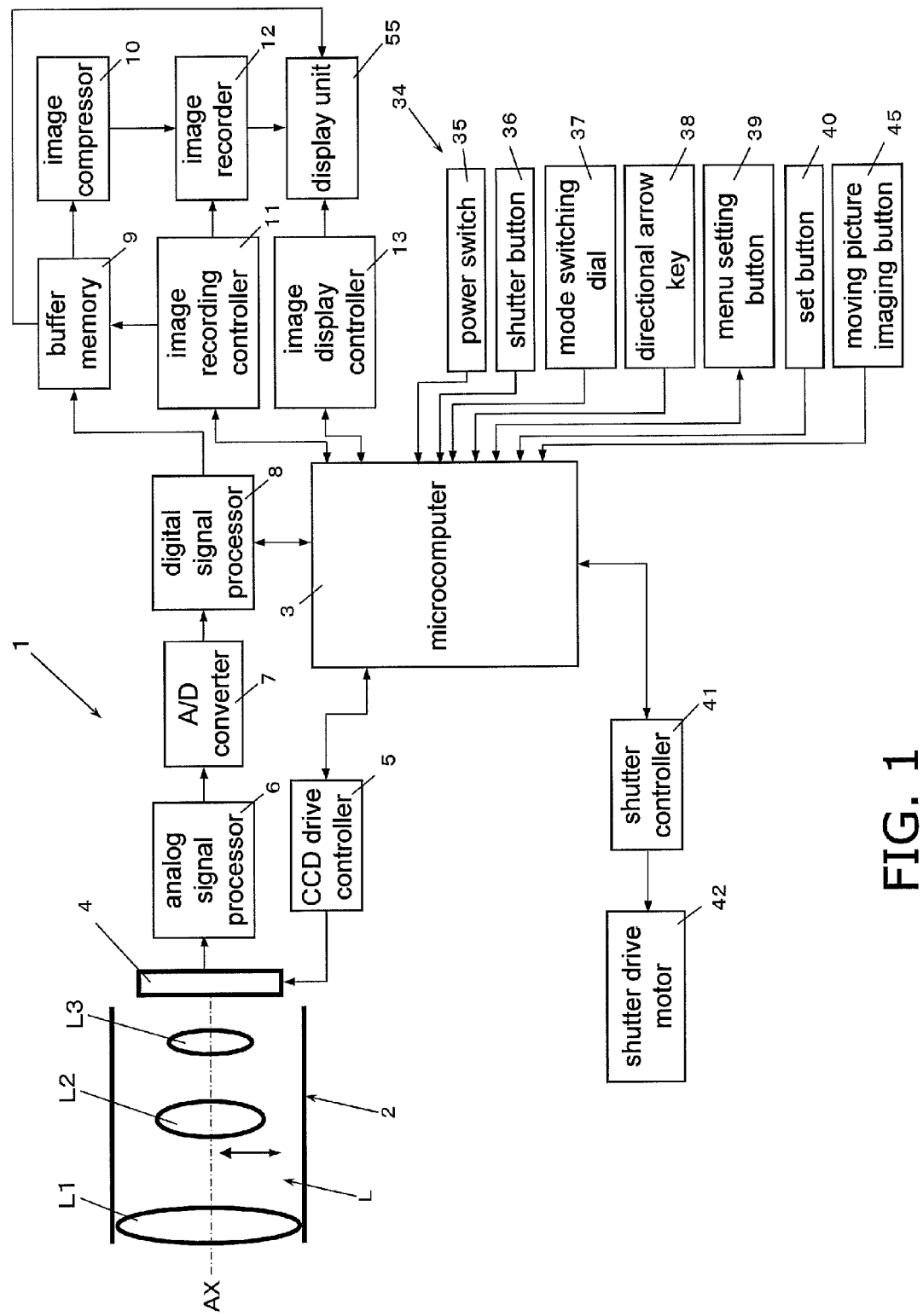
FIG. 1 is a block diagram of a digital camera control system.
Figure 2A:
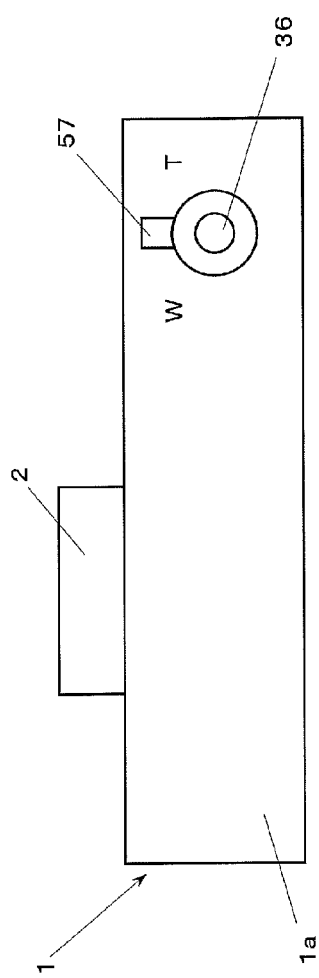
FIG. 2A is a top view of a digital camera.
Figure 2B:
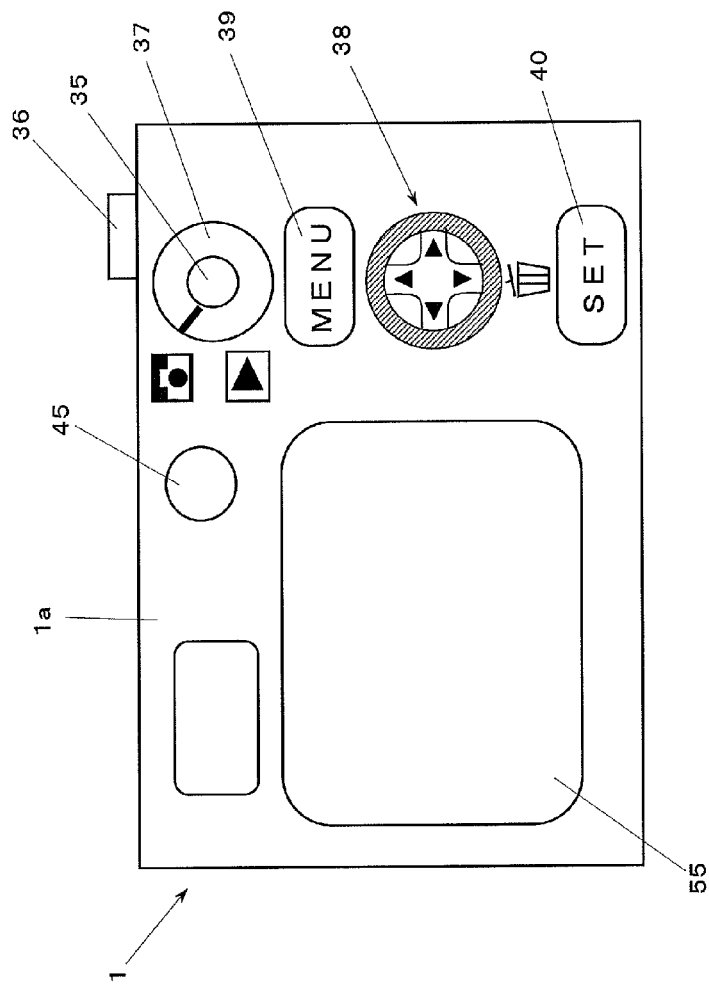
FIG. 2B is a rear view of a digital camera.

A digital camera 1 according to a first embodiment will be described through reference to FIGS. 1 and 2. FIG. 1 is a block diagram of the simplified configuration of the digital camera 1. FIG. 2A is a top view of the digital camera 1, and FIG. 2B is a rear view of the digital camera 1. As shown in FIG. 2, we will let the Z axis direction be the direction along the optical axis AX of the digital camera 1, the X axis direction be the left and right direction of the digital camera 1, and the Y axis direction be the up and down direction of the digital camera 1. These directions do not limit how the digital camera 1 is used.

As shown in FIG. 1, the digital camera 1 (an example of an imaging device) has an optical system L, a microcomputer 3, an image sensor 4 (an example of an image acquisition section), a CCD drive controller 5, a shutter controller 41, and a shutter drive motor 42.

The optical system L is an optical system for forming an optical image of a subject, and includes three lens groups L1, L2, and L3. The optical system L is supported by a lens barrel 2. The first lens group L1 is a lens group for performing focussing, and is provided so as to be capable of movement along the optical axis. The third lens group L3 is a lens group for performing zooming, and is provided so as to be capable of movement along the optical axis AX. The second lens group L2 is a lens group for correcting blurring of the image caused by movement of the digital camera 1, and is provided so as to be capable of movement in a plane perpendicular to the optical axis AX. Blurring of the image can be corrected by using the second lens group L2 to make the optical axis eccentric. The second lens group L2 is included in a blur correction device 20 (discussed below).

The microcomputer 3 is a unit for controlling the entire digital camera 1, and is connected to various units.

The shutter controller 41 drives the shutter drive motor 42 on the basis of a control signal from the microcomputer 3 in order to operate the shutter. This control signal is generated by the microcomputer 3 on the basis of a timing signal obtained by pressing a shutter button 36.

The image sensor 4 is a CCD, for example, and converts an optical image formed by the optical system L into an electrical image signal. Drive of the imaging sensor 4 is controlled by the CCD drive controller 5. The imaging sensor 4 may instead be a CMOS sensor.

As shown in FIG. 1, a control panel 34 is provided to the digital camera 1 in order to input control information from the outside. More specifically, the control panel 34 has a power switch 35, the shutter button 36, a mode switching dial 37, a directional arrow key 38, a menu setting button 39, and a set button 40. The microcomputer 3 is connected to the control panel 34, and is able to receive signals from the control panel 34.

As shown in FIGS. 2A and 2B, the optical system L and the lens barrel 2 are disposed on the front face of a housing 1a, and the power switch 35, the mode switching dial 37, the directional arrow key 38, the menu setting button 39, the set button 40, a moving picture imaging button 45, and the display unit 55 are disposed on the rear face. The shutter button 36 and a zoom lever 57 are disposed on the top face of the housing 1a.

The zoom lever 57 is provided around the shutter button 36 so as to be capable of rotating coaxially with the shutter button 36. The power switch 35 is used for switching the power on and off to the digital camera 1. The mode switching dial 37 is used for switching between still picture imaging mode, moving picture imaging mode, and reproduction mode. When the still picture imaging mode is selected with the mode switching dial 37, the imaging mode can be switched to still picture imaging mode, and when the moving picture imaging mode is selected with the mode switching dial 37, the imaging mode can be switched to moving picture imaging mode. In moving picture imaging mode, basically moving picture imaging is possible. When the reproduction mode is selected with the mode switching dial 37, the captured image can be displayed on the display unit 55. Also, if the zoom lever 57 is rotated to the right in a state in which the imaging mode has been switched to still picture imaging mode or moving picture imaging mode, the lens barrel 2 is driven to the telephoto side by a zoom motor (not shown), and when this lever is rotated to the left, the lens barrel 2 is driven to the wide angle side by the zoom motor. The operation of the zoom motor is controlled by the microcomputer 3.

The moving picture imaging button 45 is used to start and stop moving picture imaging, and regardless of whether the imaging mode set on the mode switching dial 37 is the still picture imaging mode or the moving picture imaging mode, when this moving picture imaging button 45 is pressed, the moving picture imaging mode is forcibly started, irrespective of the setting on the mode switching dial 37. Furthermore, when this moving picture imaging button 45 is pressed in moving picture imaging mode, moving picture imaging is stopped and the mode changes to still picture imaging mode or reproduction mode.

The menu setting button 39 is used to display various menus on the display unit 55. The directional arrow key 38 is a button with which the user presses the top, bottom, left, or right side and uses the menu setting button 39 to select the desired category or menu from among the various menus displayed on the display unit 55. The set button 40 is used to execute the options on the various menus. The set button 40 as a separate function, in which it serves as a shutter button that can be pressed during moving picture imaging so that still pictures are captured at the same time.

As shown in FIG. 1, the digital camera 1 further has an analog signal processor 6, an A/D converter 7, a digital signal processor 8, a buffer memory 9, an image compressor 10, an image recording controller 11, an image recorder 12, an image display controller 13, and the display unit 55.

The image signal outputted from the imaging sensor 4 is processed by the analog signal processor 6, the A/D converter 7, the digital signal processor 8, the buffer memory 9, and the image compressor 10, in that order. The analog signal processor 6 subjects the image signal outputted from the imaging sensor 4 to gamma processing or other such analog signal processing. The A/D converter 7 converts the analog signal outputted from the analog signal processor 6 into a digital signal. The digital signal processor 8 subjects the image signal that has been converted into a digital signal by the A/D converter 7 to noise elimination, contour enhancement, or other such digital signal processing. The buffer memory 9 is a random access memory (RAM), and temporarily stores the image signal processed by the digital signal processor 8.

The image signal recorded to the buffer memory 9 is further processed by the image compressor 10 and the image recorder 12, in that order. The image signal stored in the buffer memory 9 is sent to the image compressor 10 at the command of the image recording controller 11, and the data of the image signal is compressed. The image signal is compressed to a data size that is smaller than that of the original data. The compression method can be, for example, JPEG (Joint Photographic Experts Group). For a moving picture, MPEG (Moving Picture Experts Group) is used. At the same time, the image compressor 10 produces a reduced image signal corresponding to the image used for the thumbnail display, etc. After this, the compressed image signal and the reduced image signal are sent to the image recorder 12. In this embodiment, JPEG is used for still pictures and MPEG for moving pictures, but the methods are not limited to these.

The image recorder 12 is constituted by an internal memory 50 (not shown) provided to the main part of the digital camera 1, a removable memory (not shown), or the like, and records an image signal (moving picture images and still picture images), a corresponding reduced image signal, and specific information on the basis of a command from the image recording controller 11, with these signals and information recorded such that they are associated with one another. Examples of the specific information recorded along with these image signals include the date and time an image was captured, focal length information, shutter speed information, aperture value information, and imaging mode information. Also, with this digital camera 1, orientation information and panning information about the digital camera 1 (discussed below) and movement information about the subject are included as specific information.

The image display controller 13 is controlled by a control signal from the microcomputer 3. The display unit 55 displays the image signal recorded to the image recorder 12 or the buffer memory 9 as a visible image at a command from the image display controller 13. The display state of the display unit 55 may be a state in which just the image signal is displayed, or a state in which the above-mentioned specific information is displayed along with the image signal. The display of the specific information is switched by operation of the menu setting button 39, for example.

Configuration of Blur Correction Device

Figure 3:
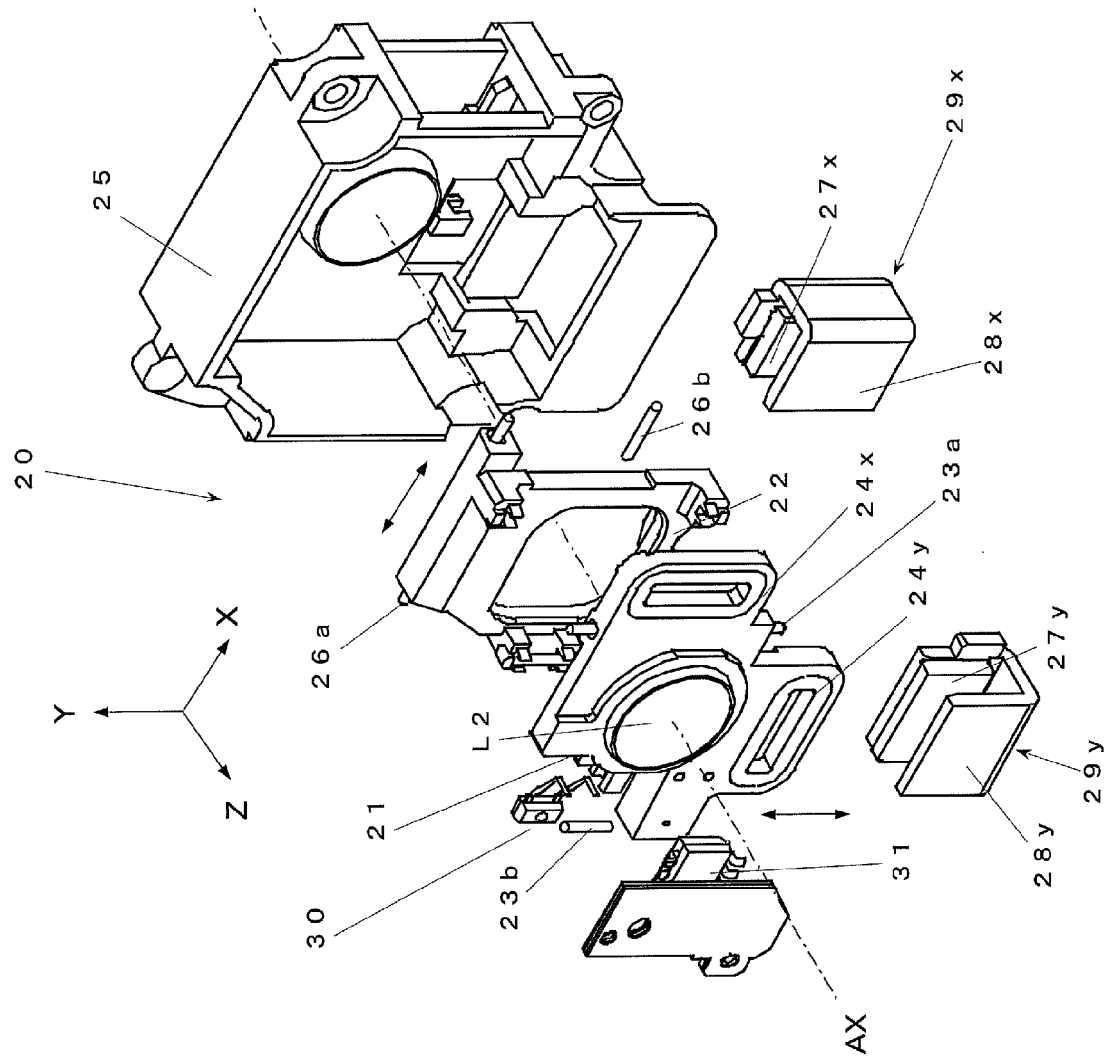
FIG. 3 is a hardware configuration diagram of a blur correction device.

Next, the configuration of a blur correction device 20 will be described through reference to FIGS. 3 and 4. FIG. 3 is an exploded oblique view of the blur correction device 20.

When the digital camera 1 is subjected to mechanical vibration, shaking of the user's hands, etc., the optical axis of the light incident on the lens from the subject becomes misaligned with the optical axis of the lens, so the resulting image is not sharp. The blur correction device 20 is installed in the digital camera 1 to prevent this blurring of the image. More specifically, as shown in FIGS. 3 and 4, the blur correction device 20 has a pitch support frame 21, a yaw support frame 22, a fixed frame 25, a yaw actuator 29x, a pitch actuator 29y, a light emitting element 30, and a light receiving element 31.

Coils 24x and 24y are provided to the pitch support frame 21. The second lens group L2 and the light emitting element 30 are fixed to the pitch support frame 21. The pitch support frame 21 is supported by the yaw support frame 22 via two pitch shafts 23a and 23b so as to be capable of relative movement in the Y direction.

The yaw support frame 22 is supported by the fixed frame 25 via yaw shafts 26a and 26b so as to be capable of relative movement in the X direction. The yaw actuator 29x has a magnet 27x and a yoke 28x, and is supported on the fixed frame 25. The pitch actuator 29y has a magnet 27y and a yoke 28y, and is supported on the fixed frame 25. The light receiving element 31 is fixed to the fixed frame 25, and receives light projected from the light emitting element 30. The two-dimensional position coordinates of the second lens group L2 can be detected by the light emitting element 30 and the light receiving element 31.

Figure 4:
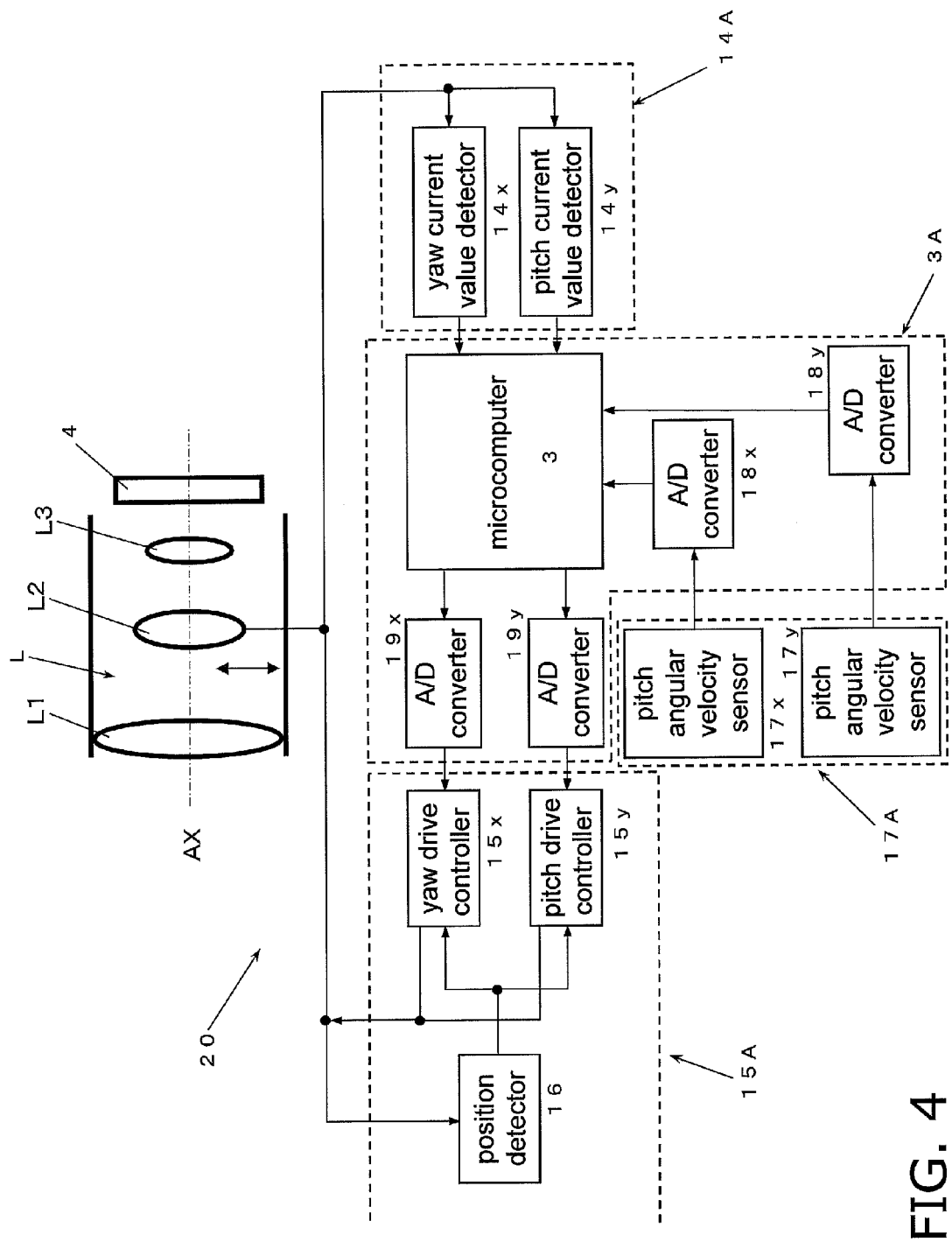
FIG. 4 is an exploded oblique view of a blur correction device.

As shown in FIG. 4, the blur correction device 20 further has a movement corrector 15A, an orientation detector 14A, a movement detector 17A, and a signal processor 3A that includes the microcomputer 3. The movement corrector 15A includes the second lens group L2, a yaw drive controller 15x, a pitch drive controller 15y, and a position detector 16. Drive of the second lens group L2 in two directions perpendicular to the optical axis AX (the X axis direction and the Y axis direction) is controlled by the yaw drive controller 15x and the pitch drive controller 15y. The X axis direction will hereinafter be referred to as the yaw direction, and the Y axis direction as the pitch direction. The position detector 16 is a unit for detecting the position of the second lens group L2 within the X-Y plane on the basis of the output from the light receiving element 31, and, along with the yaw drive controller 15x and the pitch drive controller 15y, forms a feedback control loop for controlling the operation of the second lens group L2.

The orientation detector 14A includes a yaw current value detector 14x and a pitch current value detector 14y. The yaw current value detector 14x detects the value of the current supplied to the coil 24x when the yaw actuator 29x operates (discussed below). The pitch current value detector 14y detects the value of the current supplied to the coil 24y when the pitch actuator 29y operates. The orientation of the digital camera 1 can be detected by detecting these current values.

The movement detector 17A includes a yaw angular velocity sensor 17x and a pitch angular velocity sensor 17y. The angular velocity sensors 17x and 17y are used for detecting movement of the digital camera 1 itself, including the imaging optical system L, produced by shaking of the user's hands and other such vibrations, etc., and detect movement in the yaw direction and pitch direction. More precisely, the yaw angular velocity sensor 17x is mainly used for detecting the angular velocity of the digital camera 1 around the Y axis. The pitch angular velocity sensor 17y is mainly used for detecting the angular velocity of the digital camera 1 around the X axis. The angular velocity sensors 17x and 17y use as a reference the output when the digital camera 1 is stationary, and output positive or negative angular velocity signals depending on the direction in which the digital camera 1 is moving. The outputted signals are processed by a signal processor 3A.

The signal processor 3A includes the microcomputer 3, A/D converters 18x and 18y, and D/A converters 19x and 19y. The signals outputted from the angular velocity sensors 17x and 17y undergo filtering, amplification, or other such processing, and are then converted into digital signals by the A/D converters 18x and 18y and outputted to the microcomputer 3. The microcomputer 3 subjects the output signals of the angular velocity sensors 17x and 17y, which have been taken in via the A/D converters 18x and 18y, to filtering, integration, phase compensation, gain adjustment, clipping, or other such processing. The result of performing this processing is that the microcomputer 3 computes the amount of drive control of the second lens group L2 needed for movement correction, and produces a control signal. The control signal thus produced is outputted through the D/A converters 19x and 19y to the yaw drive controller 15x and the pitch drive controller 15y. As a result, the yaw drive controller 15x and the pitch drive controller 15y drive the second lens group L2 on the basis of the control signal, and the image blurring is corrected.

Panning Mode Signal

With this digital camera 1, the angular velocity sensors 17x and 17y can be utilized to acquire a panning mode signal 60 (first movement information) related to the direction of panning, etc. More specifically, during panning, a state continues in which the angular velocities outputted from the angular velocity sensors 17x and 17y have the same sign and the outputted angular velocities are at or above a specific level. This is utilized by the microcomputer 3 to determine whether or not the angular velocity signals from the angular velocity sensors 17x and 17y are at or above a certain threshold continuously for a specific length of time, and the panning mode signal 60 shown in FIG. 5 is produced by the microcomputer 3 on the basis of this determination result.

For example, if the user pans to the right (facing the subject) during imaging, the microcomputer 3 comes to the conclusion of "none" regarding panning in the vertical (Y axis) direction from the output signal of the pitch angular velocity sensor 17y. Meanwhile, the microcomputer 3 concludes from the output signal of the yaw angular velocity sensor 17x that panning in the horizontal (X axis) direction is "to the right." Therefore, the panning mode signal 60 is "2."

When the user pans upward and to the left (facing the subject), the microcomputer 3 concludes from the output signal of the pitch angular velocity sensor 17y that the panning in the vertical direction is "upward," and concludes from the output signal of the yaw angular velocity sensor 17x that the panning in the horizontal direction is "to the left." Therefore, the panning mode signal 60 is "4."

Thus, movement of the digital camera 1 during imaging can be ascertained by the yaw angular velocity sensor 17x and the pitch angular velocity sensor 17y. The panning mode signal 60 is utilized in deciding the layout of the images displayed on the display unit 55.

Orientation Determination Signal

Also, with this digital camera 1, in addition to the panning mode signal 60, the yaw current value detector 14x and the pitch current value detector 14y find an orientation determination signal 61 in order to determine the orientation of the digital camera 1.

Figure 6:
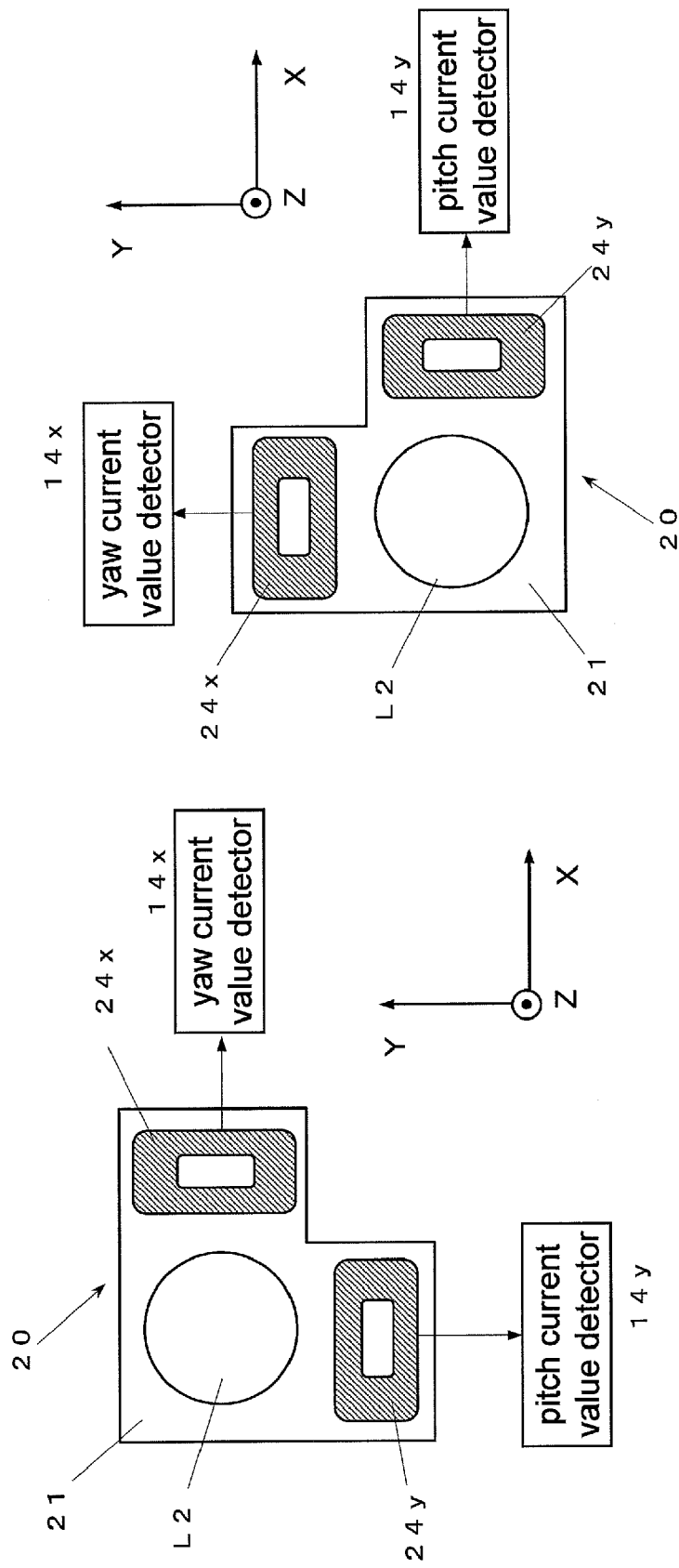
FIGS. 6A and 6B are diagrams of the orientation of a blur correction device.
Figure 7:
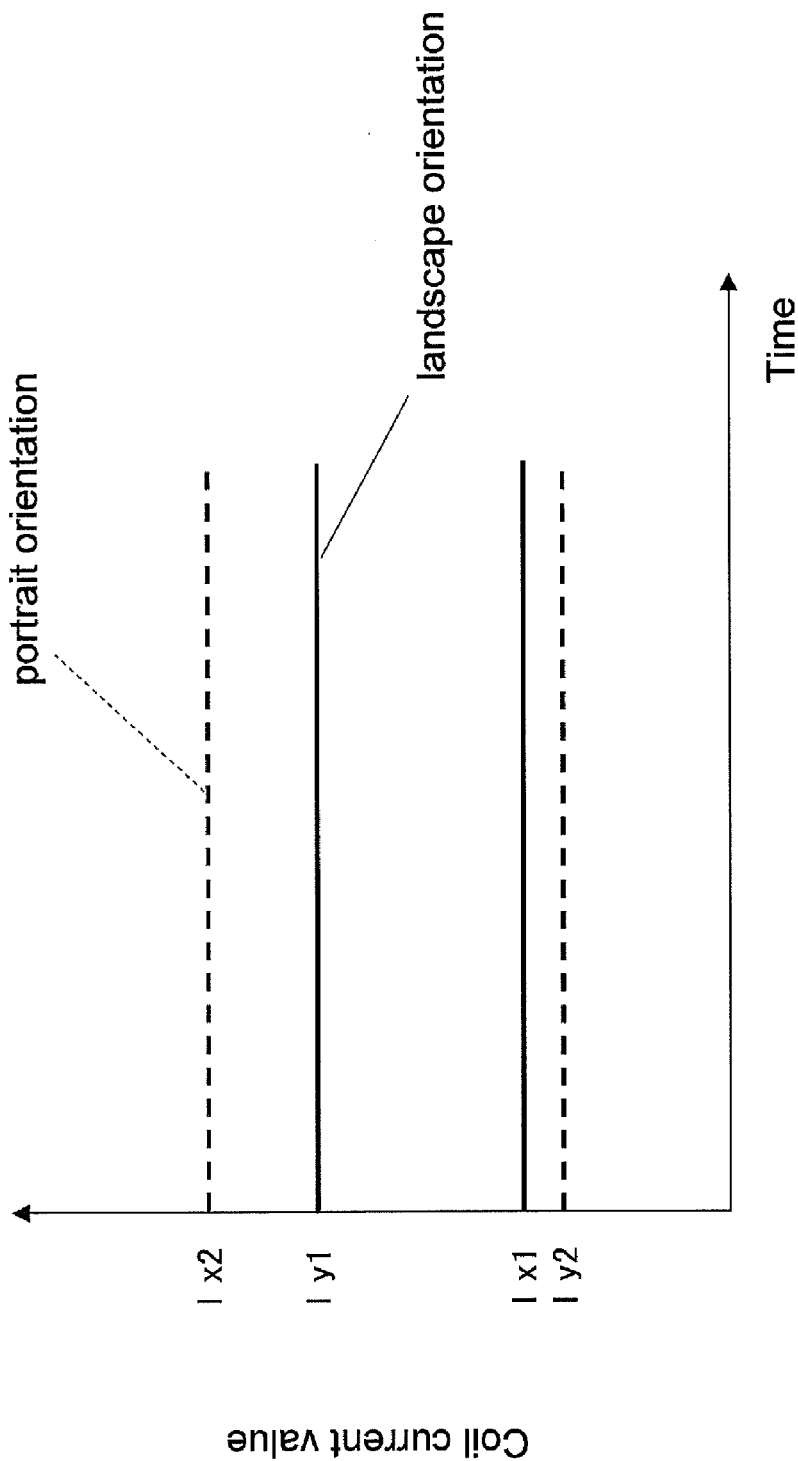
FIG. 7 is a graph of the coil supply current for different imaging orientations.

Next, the method for detecting the current value with the yaw current value detector 14x and the pitch current value detector 14y will be described through reference to FIGS. 6 and 7. FIG. 6A shows the orientation of the blur correction device 20 in imaging with a landscape orientation, and FIG. 6B shows the orientation of the blur correction device 20 in imaging with a portrait orientation. FIG. 7 is a graph of the coil supply current for each imaging orientation. The term "landscape orientation" as used here means that the lengthwise direction of the display unit 55 (the lengthwise direction of the housing 1a) substantially coincides with the horizontal direction, and "portrait orientation" means that the lengthwise direction of the display unit 55 substantially coincides with the vertical direction.

As shown in FIG. 6A, in landscape orientation, since the pitch direction substantially coincides with the vertical direction, the pitch support frame 21 that supports the second lens group L2 wants to go down under its own weight in the Y axis direction. Since the second lens group L2 must be supported at a specific position (near the center of the optical axis AX, for example) in order to obtain a good image, current is supplied to the coil 24y, and the pitch actuator 29y generates electromagnetic force for supporting the pitch support frame 21 on the fixed frame 25. As shown in FIG. 7, the current value at this point is termed Iy1, for example.

Figure 8:
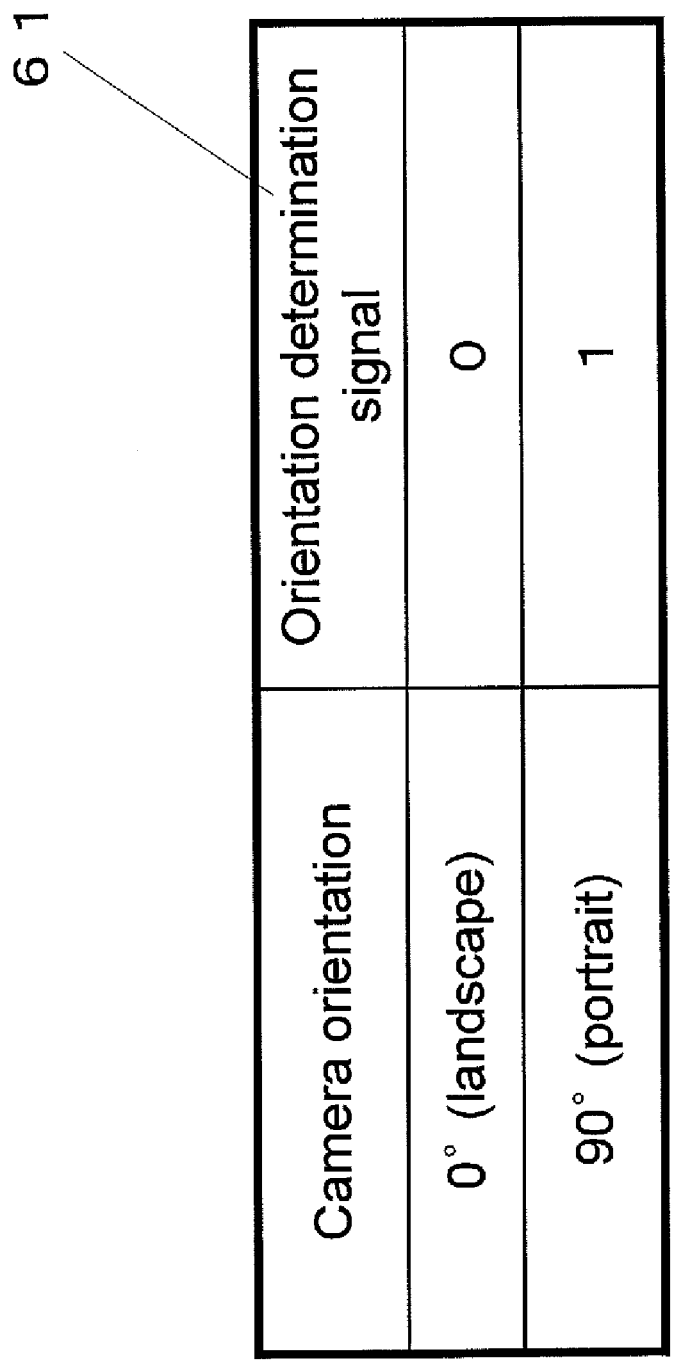
FIG. 8 is a table of orientation identification signals.

Meanwhile, since the yaw direction substantially coincides with the horizontal direction, the yaw actuator 29x does not need to generate any extra electromagnetic force to support the weight of the yaw support frame 22 or the pitch support frame 21. Therefore, the current value Ix1 supplied to the coil 24x is smaller than the current value Iy1 supplied to the coil 24y. The microcomputer 3 has a function of comparing the current values detected by the current value detectors 14x and 14y, and a function of determining the orientation of the digital camera 1. Therefore, the current values Ix1 and Iy1 are compared by the microcomputer 3, and the orientation of the digital camera 1 is determined to be landscape orientation as shown in FIG. 8. At this point the orientation determination signal 61 is "0," for example.

As shown in FIG. 6B, in portrait orientation, since the yaw direction substantially coincides with the vertical direction, the yaw support frame 22 that supports the pitch support frame 21 and the second lens group L2 wants to go downward in the Y axis direction due to its own weight and the weight of these members. Since the second lens group L2 must be supported at a specific position (near the center of the optical axis AX, for example) in order to obtain a good image, current is supplied to the coil 24x at this point, and the yaw actuator 29x generates electromagnetic force for supporting the yaw support frame 22 on the fixed frame 25. As shown in FIG. 7, the current value at this point is termed Ix2, for example.

Meanwhile, since the pitch direction substantially coincides with the vertical direction, the pitch actuator 29y does not need to generate any extra electromagnetic force to support the weight of the pitch support frame 21 or the second lens group L2. Therefore, the current value Iy2 supplied to the coil 24y is smaller than the current value Ix1 supplied to the coil 24x. Therefore, orientation of the digital camera 1 is determined by the microcomputer 3 to be portrait orientation as shown in FIG. 8. At this point the orientation determination signal 61 is "1," for example.

As discussed above, the value of the current supplied to the coils 24x and 24y varies according to the orientation of the digital camera 1 during imaging. That is, the orientation of the digital camera 1 during imaging can be ascertained by detecting the value of the current supplied to the coils 24x and 24y. Therefore, the blur correction device 20 is a mechanism for suppressing the degradation of images caused by movement of the digital camera 1 (called hand shake), and can also be utilized as an orientation detector for the digital camera 1.

Capture of Moving Pictures

The digital camera 1 has two imaging modes: still picture imaging mode and moving picture imaging mode.

Figure 9:
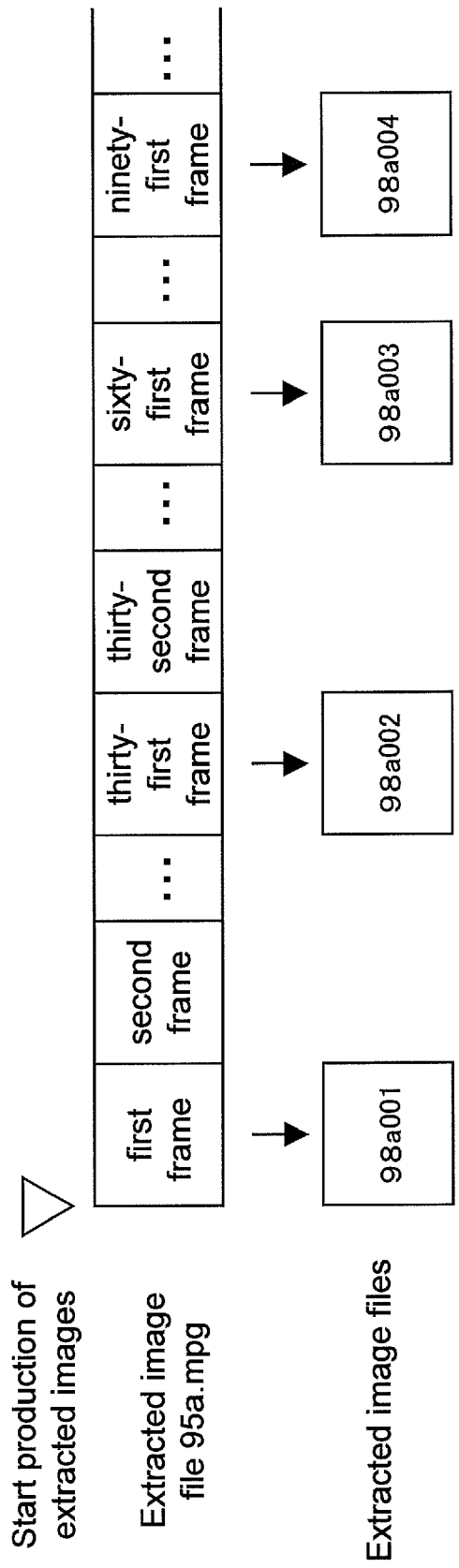
FIG. 9 is a diagram of the correspondence between a moving picture file and a produced image file.

With the digital camera 1, the recording of a moving picture file is begun by pressing the shutter button 36 in moving picture imaging mode, or by pressing the moving picture imaging button 45. As shown in FIG. 9, when the shutter button 36 or the moving picture imaging button 45 is pressed again to stop the recording of a moving picture file, a plurality of still pictures acquired for each from at specific time intervals (such as intervals of $1/30^{th}$ of a second) are recorded to the image recorder 12 as a moving picture file "95a.mpg." For example, this moving picture file "95a.mpg" has a first frame image, a second frame image, . . . , and a $100^{th}$ frame image. During this moving picture imaging, the panning mode signals and orientation identification signals described previously are also recorded to the image recorder 12 along with the frame images.

Production of Still Pictures from Moving Pictures

Figure 10:
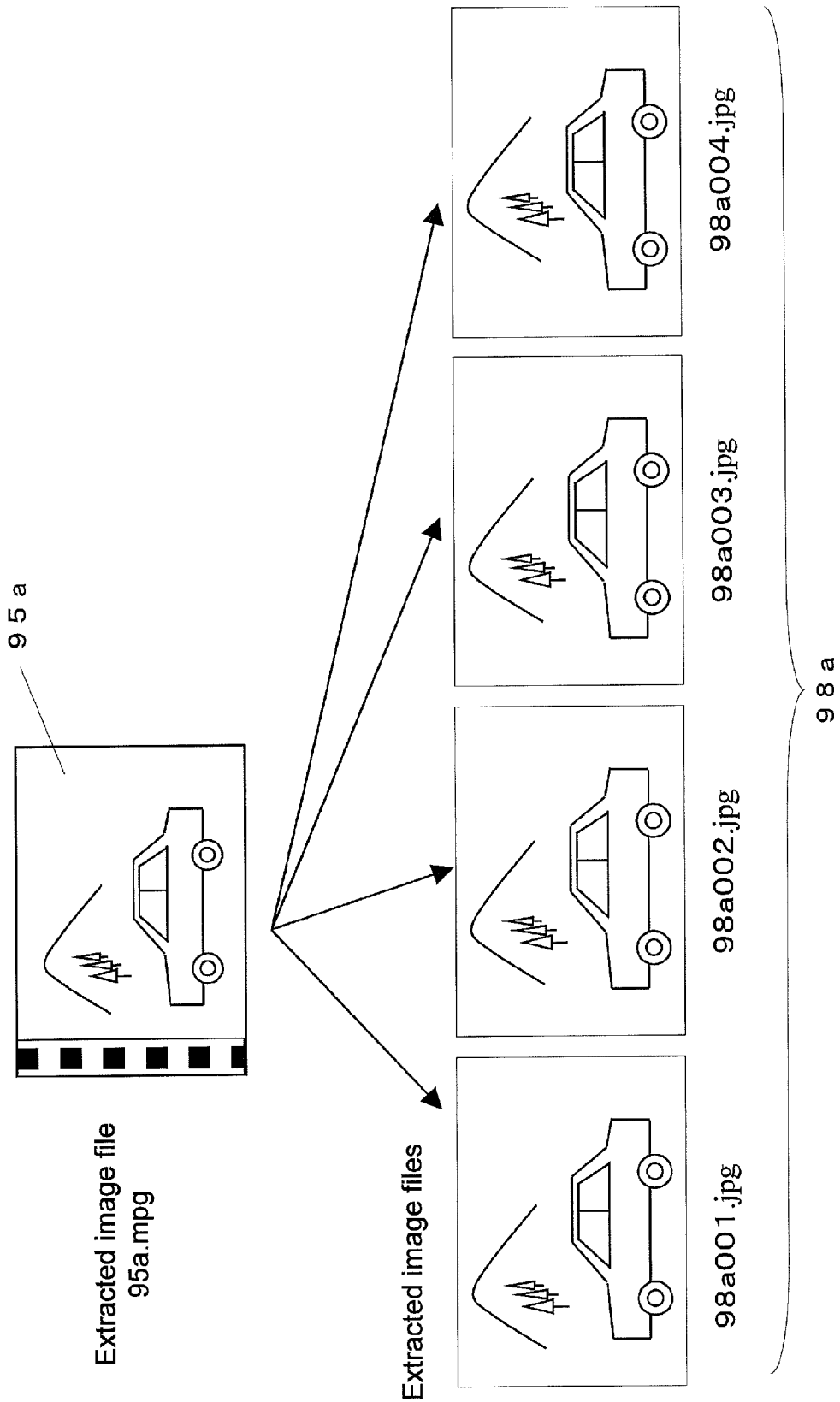
FIG. 10 is a diagram illustrating FIG. 9 in further detail.

FIGS. 9 and 10 are diagrams showing the correspondence of a moving picture file and a still picture file, and illustrates the production of a still picture file from a moving picture file.

With this digital camera 1, as will be discussed below, a moving picture is recorded to the image recorder 12, after which a plurality of extracted image files can be produced from the recorded moving picture file. For instance, extracted image files "98a001.jpg," "98a002.jpg," "98a003.jpg," and "98a004.jpg" are newly produced as extracted images from the first, thirty-first, sixty-first, and ninety-first frames, which are the desired frames from among the moving picture file "95a.mpg." In this embodiment, extracted images are produced by extracting still pictures at the same time (frame) intervals. These extracted images can be thought of as representative images from among the plurality of still pictures.

Also, since the panning mode signals 60 and the orientation determination signals 61 are recorded to the image recorder 12 along with the frame images, the panning mode signals 60 and the orientation determination signals 61 corresponding to the produced extracted image files are recorded to the image recorder 12 along with the extracted image files.

The system may be such that the time (frame) interval and number of extracted images produced from a moving picture can be freely set by the user, or may be such that these are automatically set by the microcomputer 3. When the time interval and number of images are determined automatically, it is possible, for example, to increase the number of produced images and shorten the production interval during periods of sudden movement of the subject in a moving picture or during periods of sudden movement of the digital camera 1 during panning.

Image File Management Method

Figure 11:
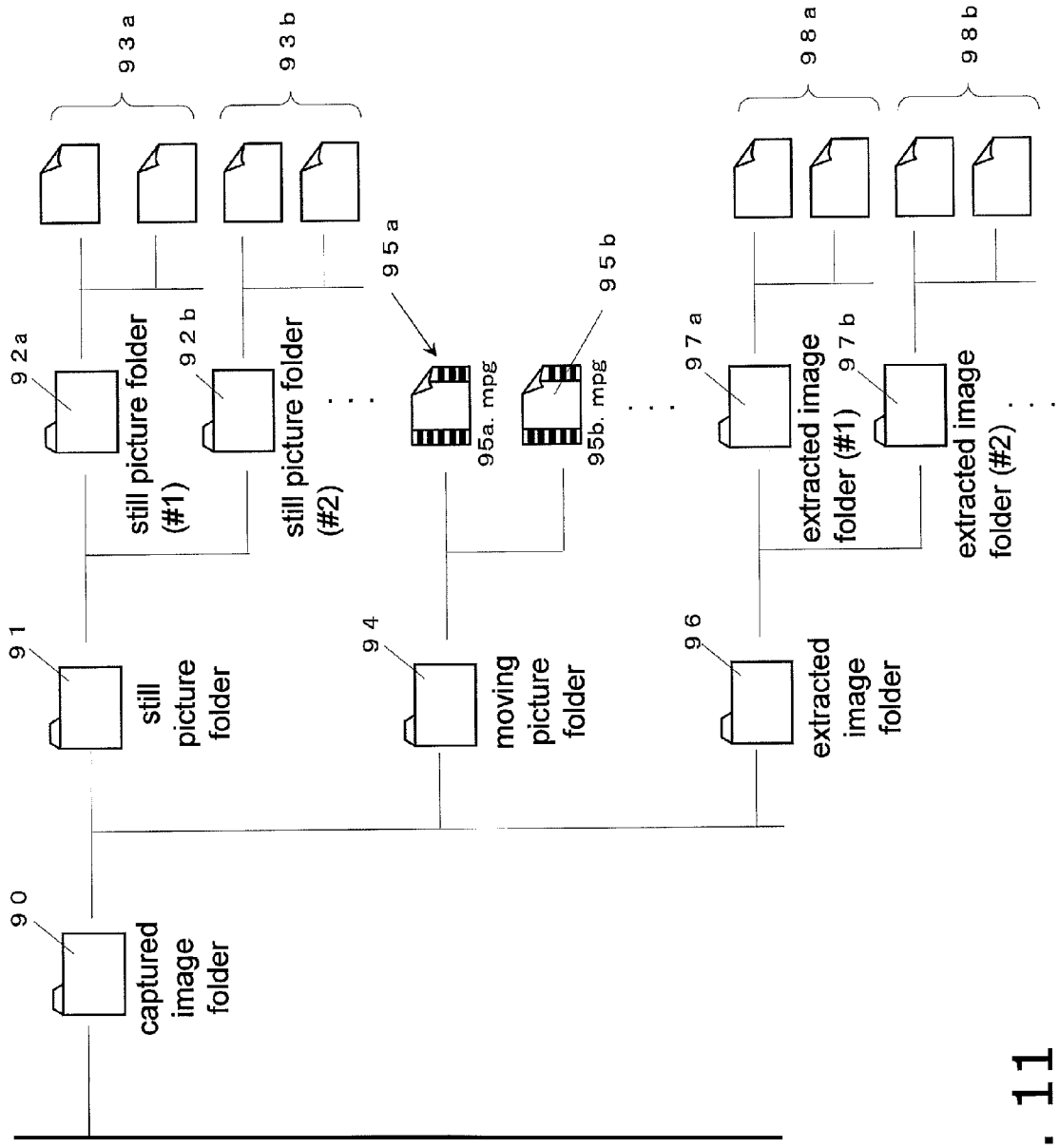
FIG. 11 is a diagram illustrating the method for managing captured image files.

The method for managing image files will now be described through reference to FIGS. 11 and 12. As shown in FIG. 11, a captured image folder 90 is formed in the internal memory 50 or the removable memory 51. A still picture folder 91, a moving picture folder 94, and an extracted image folder 96 are formed at a lower hierarchical level than the captured image folder 90. Still picture folders 92a, 92b, etc., are formed at a lower hierarchical level than the still picture folder 91. An extracted image folder (#1) 97a, an extracted image folder (#2) 97b, etc., are formed at a lower hierarchical level than the extracted image folder 96.

The plurality of extracted images produced from the moving picture file 95a are stored in the extracted image folder (#1) 97a as an extracted image group 98a along with the panning mode signals 60 and the orientation determination signals 61. At the same time, the plurality of extracted image files produced form the moving picture file 95b are stored in the extracted image folder (#2) 97b as a plurality of extracted images 98b along with the panning mode signals 60 and the orientation determination signals 61.

Figure 12:
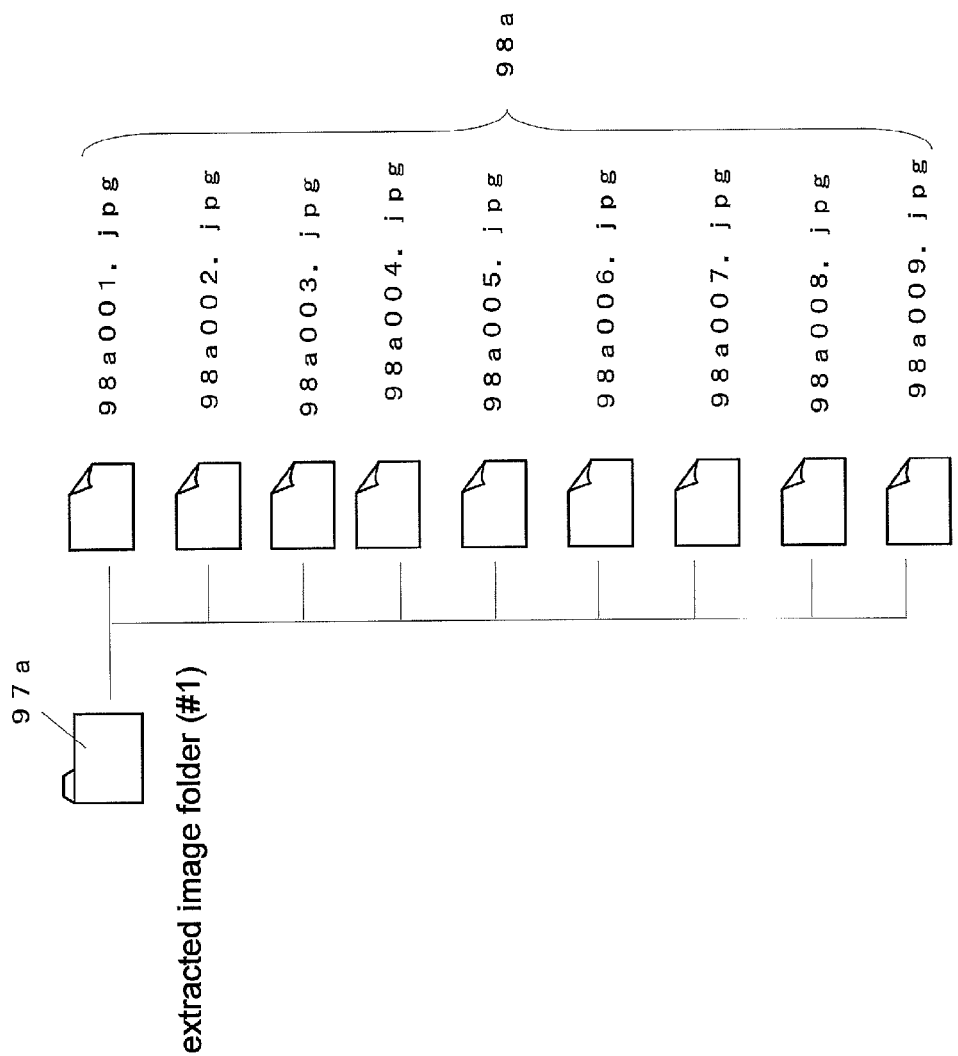
FIG. 12 is a diagram illustrating the method for managing sequentially captured image files.

As shown in FIG. 12, nine extracted images "98a001.jpg" to "98a009.jpg" produced from a moving picture file are recorded to the extracted image folder 97a, and "001" and "002" are added as part of the file name after "98a," starting from the moving picture captured first. The number of extracted images produced from the moving picture is not limited to nine.

Since a plurality of extracted images newly produced from a moving picture are thus stored in the same folder, images that are related to each other can be identified more easily by the user.

Determining Image Layout

With this digital camera 1, the layout of sequentially captured images displayed on the display unit 55 is determined by the microcomputer 3 on the basis of the panning mode signal 60. More specifically, the microcomputer 3 determines the layout of the plurality of extracted images so that the orientation of the time vector when the extracted images are lined up will substantially coincide with one component of the direction of the panning operation, according to the type of panning mode signal 60 corresponding to the plurality of extracted images produced from the moving picture.

The term "time vector" here means the vector that extends from the center of a previously acquired still picture to the center of a subsequently acquired still picture when two still pictures acquired at different times are disposed side by side.

Figure 13:
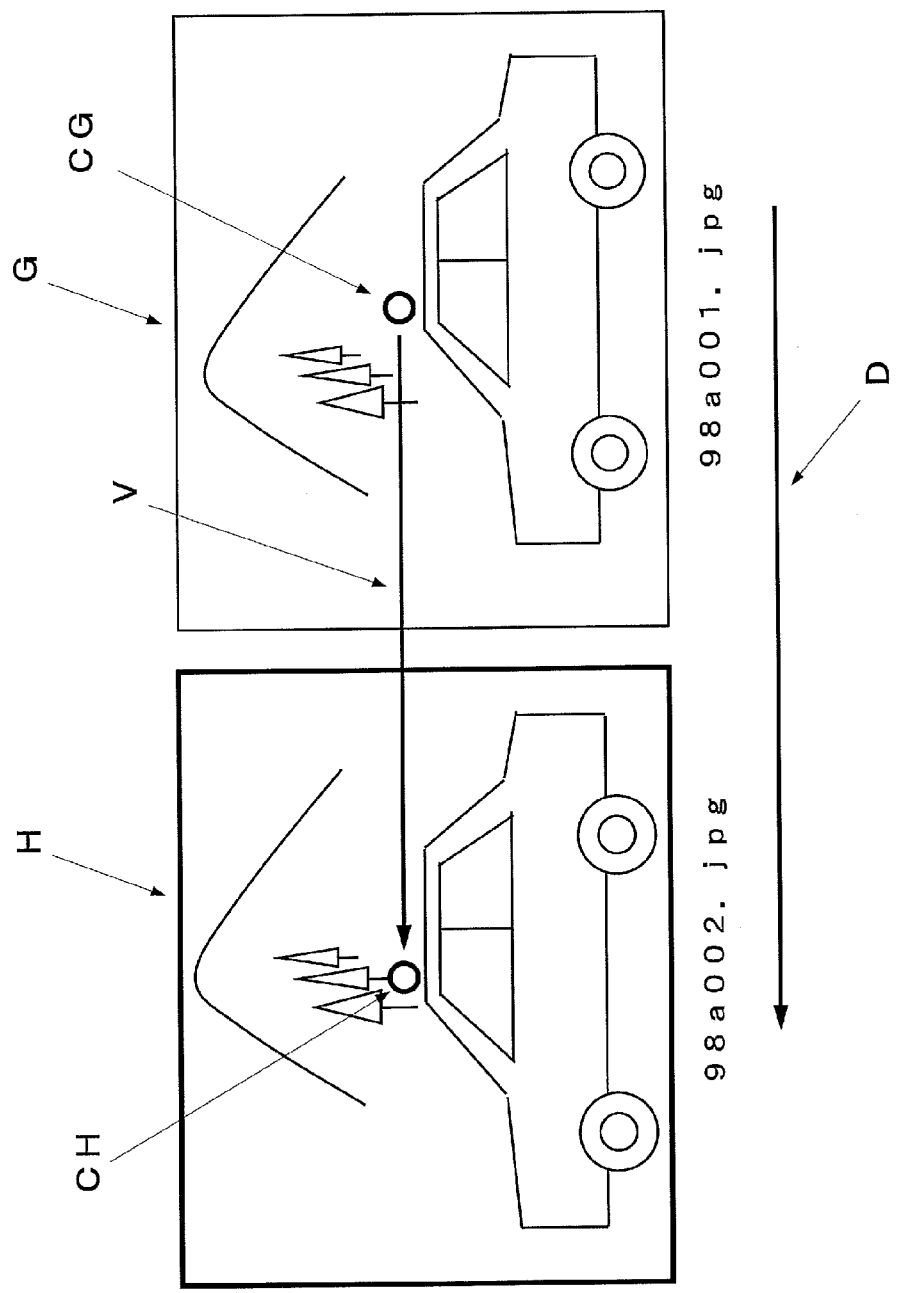
FIG. 13 is a diagram illustrating the relation between the time vector and the panning direction.

For example, as shown in FIG. 13, in the moving picture file 95a, when the extracted image file "98a001.jpg" (hereinafter referred to as the first extracted image G) and the extracted image file "98a002.jpg" acquired after the extracted image file "98a001.jpg" (hereinafter referred to as the second extracted image H) are arranged next to each other, an arrow extending from the center CG of the first extracted image G to the center CH of the second extracted image H expresses the time vector V. Thus, the time vector V expresses the flow of time as a direction when a group of extracted images acquired at different times during moving picture imaging are arranged side by side.

Figure 14:
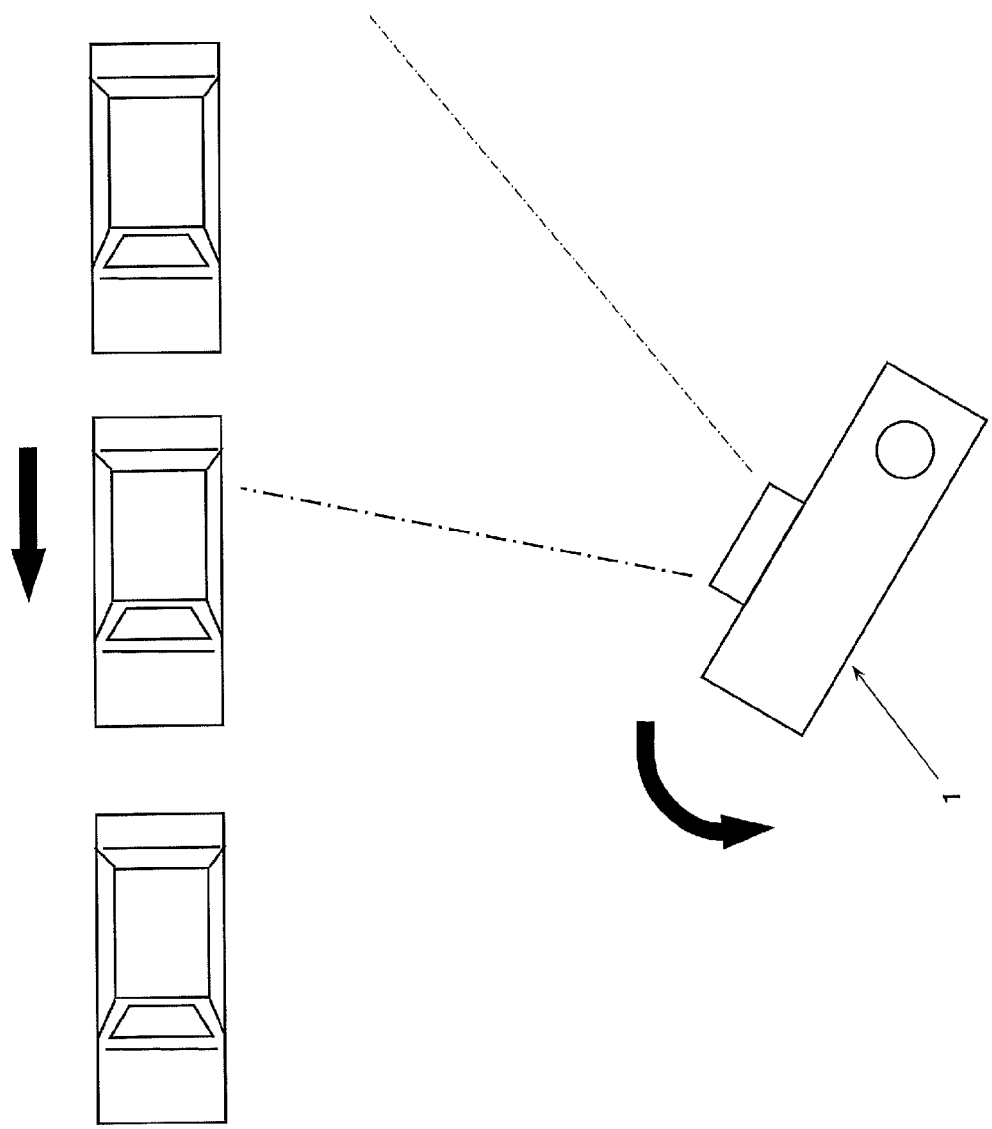
FIG. 14 is a diagram illustrating the state in panning imaging.

As shown in FIG. 14, the first extracted image G and the second extracted image H are still pictures of an automobile moving to the left, which were produced from a moving picture captured while panning to the left. Accordingly, the horizontal component of the direction of panning is the panning direction D.

Thus, if the first extracted image G and the second extracted image H are disposed side by side so that the time vector V substantially coincides with the panning direction D, then the first extracted image G and the second extracted image H will look more natural to the user than when the panning direction and the time vector do not coincide (such as when they are opposite directions).

Here, the phrase "the orientation of the time vector V substantially coincides with the panning direction D" encompasses not only a case in which the orientation of the time vector V completely coincides with the panning direction D, but also a case in which the orientation of the time vector V deviates from the panning direction D to the extent that the displayed still pictures will still look natural.

Operation of Digital Camera

Next, the operation of the digital camera 1 will be described through reference to FIGS. 1 to 8.

When the user wants to capture a moving picture, first the power switch 35 is turned on, and the mode switching dial 37 is switched to moving picture imaging mode. This puts the digital camera 1 in a moving picture imaging state. In this moving picture imaging state, movement of the digital camera 1 is detected by the angular velocity sensors 17x and 17y. The microcomputer 3 sends command signals to the yaw drive controller 15x and pitch drive controller 15y to cancel out any hand shake or the like that occurs. Current corresponding to these command signals is supplied to the coils 24x and 24y of the pitch support frame 21. The pitch support frame 21 is moved within the X-Y plane, perpendicular to the optical axis AX, by the electromagnetic force generated by the actuators 27x and 27y and the supplied current. Specifically, the blur correction device 20 moves the second lens group L2 within a plane perpendicular to the optical axis AX. Also, the light receiving element 31 is used to detect the position of the pitch support frame 21. This allows the user to correct the optical image incident on the imaging sensor 4 via the optical system L, and makes it possible to acquire a good image with reduced image degradation caused by shaking.

(1) Determining Orientation

The imaging orientation of the digital camera 1 is determined as follows. Here, we will let the reference orientation of the digital camera 1 be a landscape orientation, and will let the angle of rotation around the optical axis AX in landscape orientation be 0°. In this case, portrait orientation is a state in which the digital camera 1 is rotated 90° around the optical axis AX from the landscape orientation.

We will describe a case in which the user photographs a subject that is wider than it is tall, such as scenery, in landscape orientation. The orientation of the digital camera 1 is determined from the current detection values of the yaw current value detector 14x and the pitch current value detector 14y. In FIG. 7, when a photograph is taken in landscape orientation, that is, at an orientation of 0°, the value Ix1 of current supplied to the coil 24x of the blur correction device 20 and the value Iy1 of current supplied to the coil 24y are detected by the yaw current value detector 14x and the pitch current value detector 14y. The detected current values Ix1 and Iy1 are compared by the microcomputer 3. In this case, as shown in FIG. 7, since the current value Ix1 is smaller than the current value Iy1, the microcomputer 3 determines that the digital camera 1 is in landscape orientation.

When the user presses the shutter button 36 in this state, a horizontal moving picture is acquired. The captured moving pictures are recorded one after the other to the image recorder 12. Here, as shown in FIG. 8, the image recording controller 11 adds a "0," which indicates that the imaging orientation of the digital camera 1 is landscape orientation) (0°, as the orientation determination signal 61 to the image signal outputted from the buffer memory 9. This orientation determination signal 61 is recorded to the header or footer portion of the image signal, for example. The recording of the orientation determination signal 61 may be carried out when the image signal is outputted from the buffer memory 9, or may be carried out at the image recorder 12 after the image signal has been recorded to the image recorder 12.

Meanwhile, when the user wants to photograph a subject that is taller than it is wide, such as a person, in portrait orientation, just as in the case of landscape orientation, the orientation of the digital camera 1 is determined by the microcomputer 3 on the basis of the current values detected by the yaw current value detector 14x and the pitch current value detector 14y. In FIG. 7, when a photograph is taken in portrait orientation, the value Ix2 of current supplied to the coil 24x of the blur correction device 20 and the value Iy2 of current supplied to the coil 24y are detected by the yaw current value detector 14x and the pitch current value detector 14y. The detected current values Ix2 and Iy2 are compared by the microcomputer 3. In this case, as shown in FIG. 7, since the current value Iy2 is smaller than the current value Ix2, the microcomputer 3 determines that the digital camera 1 is in portrait orientation.

If the user presses the shutter button 36 in this state, a vertical image is acquired. The captured moving pictures are recorded one after the other to the image recorder 12. Here, the image recording controller 11 adds a "1," which indicates that the imaging orientation of the digital camera 1 is portrait orientation, as the orientation determination signal 61 to the image signal outputted from the buffer memory 9.

(2) Determining Panning Mode

Next, a case in which the user follows a moving subject to capture images sequentially by panning will be described.

As shown in FIG. 14, when an automobile moving to the left is imaged, the user pans the digital camera 1 to the left and captures a moving picture while tracking the movement of the automobile. As a result, moving pictures captured by panning are temporarily stored in the buffer memory 9 and recorded one after the other to the image recorder 12. At this point, the panning mode signal 60 is recorded along with the frame images.

Here, since the orientation of the digital camera 1 is changing to the left, the microcomputer 3 determines from the output signal of the angular velocity sensor 17y that vertical panning is "none," and determines from the output signal of the angular velocity sensor 17x that horizontal panning is "to the left." Consequently, "1" is recorded as the panning mode signal 60 along with the frame images to the image recorder 12.

Also, the above-mentioned orientation determination signal 61 is recorded along with the panning mode signal 60. In this case, since the orientation of the digital camera 1 is landscape orientation, "0" is recorded as the orientation determination signal 61 along with the frame images.

(3) Operation in Extracted Image Production Mode

Figure 15:
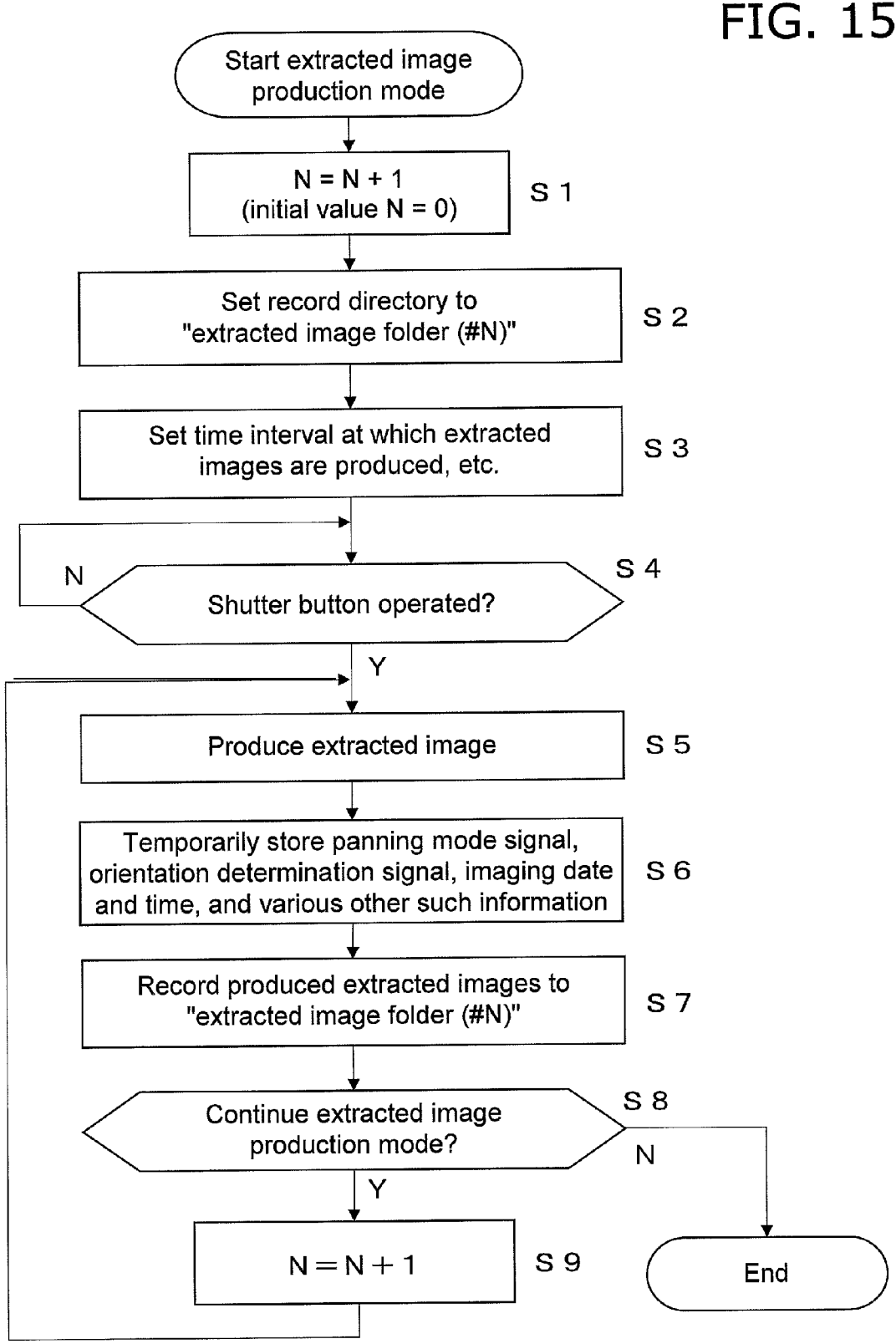
FIG. 15 is a flowchart illustrating an imaging method.
Figure 16:
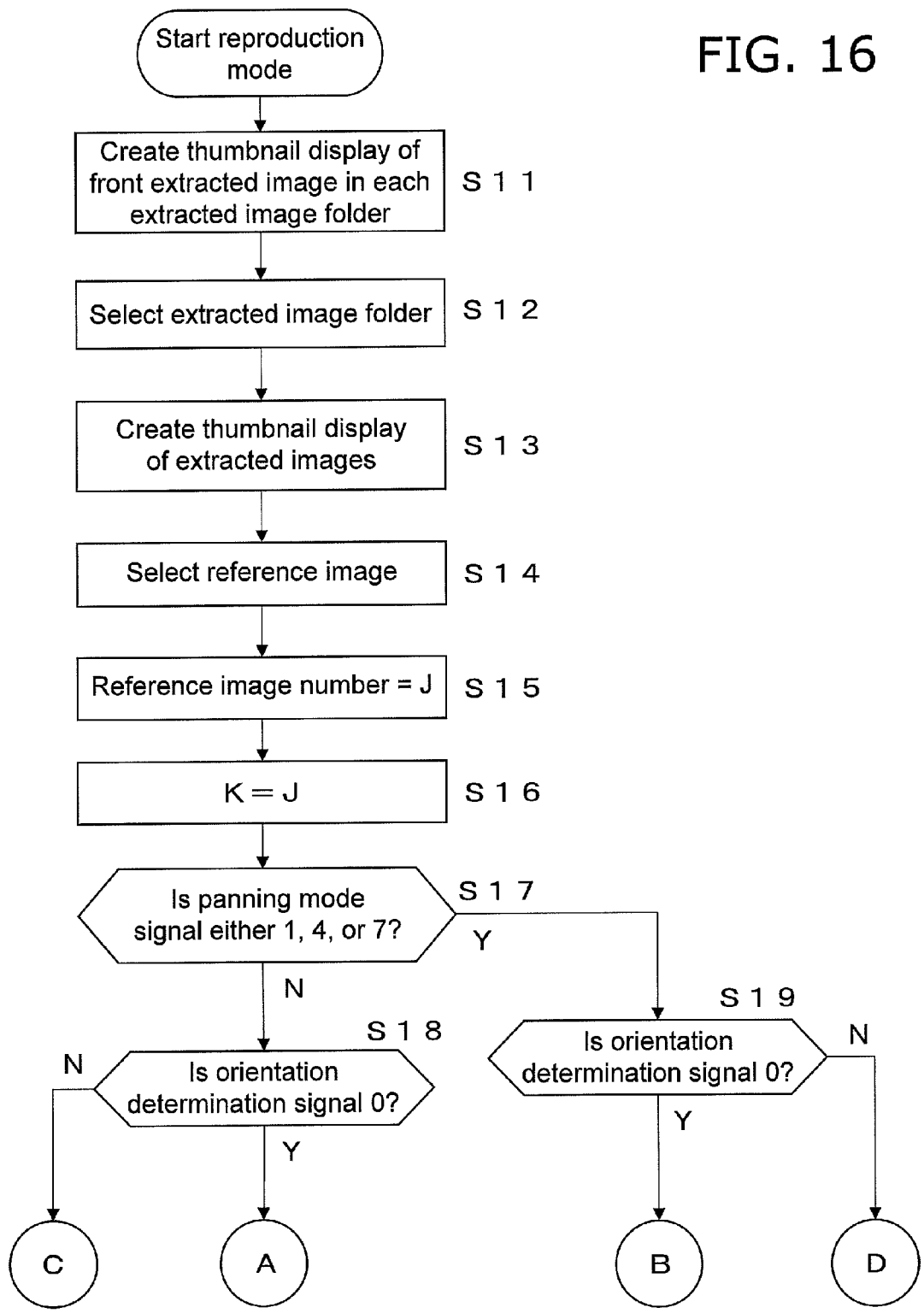
FIG. 16 is a flowchart illustrating a reproduction method.

With the digital camera 1, a plurality of extracted images can be produced from a captured moving picture. FIG. 15 is a flowchart of the extracted image production mode.

First, to set the camera to extracted image production mode, the user presses the menu setting button 39, and various menus are displayed on the display unit 55. The digital camera 1 changes to extracted image production mode when that mode is selected from among the various menus displayed.

When extracted image production mode has been selected, the microcomputer 3 adds 1 to a constant N of an initial value 0 (S1), and the directory to which the still pictures will be recorded is set to extracted image folder #1 (S2). In extracted image production mode, the user sets the time interval for extracted images produced from moving pictures, the frame interval, etc., and the number of extracted images to be produced (S3).

Next, to begin production of extracted images, the system waits for the shutter button 36 to be pressed (in this case, this is a separate function from the shutter function during imaging) (S4), and when the shutter button 36 is pressed, extracted images are produced at the set time (frame) intervals (S5), and the panning mode signal 60 corresponding to the extracted images, the orientation determination signal 61, and various information such as the date and time of the imaging are temporarily stored by the microcomputer 3 (S6). Here, when the shutter button 36 is pressed once, nine extracted images are produced continuously. The nine extracted images produced from the moving picture are recorded along with the various information mentioned above to the extracted image folder (#1) 97a of the image recorder 12 (S7). More specifically, as shown in FIGS. 11 and 12, the nine extracted images are stored as the extracted image group 98a in the extracted image folder (#1) 97a.

After this, it is determined by the microcomputer 3 whether or not extracted images are still being produced from the moving pictures (S8), and if extracted images are still being produced from the moving pictures, 1 is added to the constant N (S9), and the production of extracted images is once again carried out (S6, S7). If production is not being continued, the extracted image production mode is ended.

An indication as to whether or not the extracted images are still being produced (S8) is displayed on the display unit 55, and the microcomputer 3 decides the matter on the basis of whether or not the user has selected continuation.

(4) Operation in Extracted Image Reproduction Mode

Next, the reproduction mode, in which the plurality of extracted images produced from a moving picture are displayed on the display unit 55, will be described through reference to FIGS. 16 to 20. FIGS. 16 to 20 are flowcharts of the reproduction mode, and FIG. 21 is an example of a thumbnail display of images stored in an extracted image folder.

First, to produce a thumbnail display of the extracted images produced from a moving picture on the display unit 55 for each image folder, after the power switch 35 is turned on, the mode switching dial 37 is turned to reproduction mode. This begins the reproduction mode.

Figure 21:
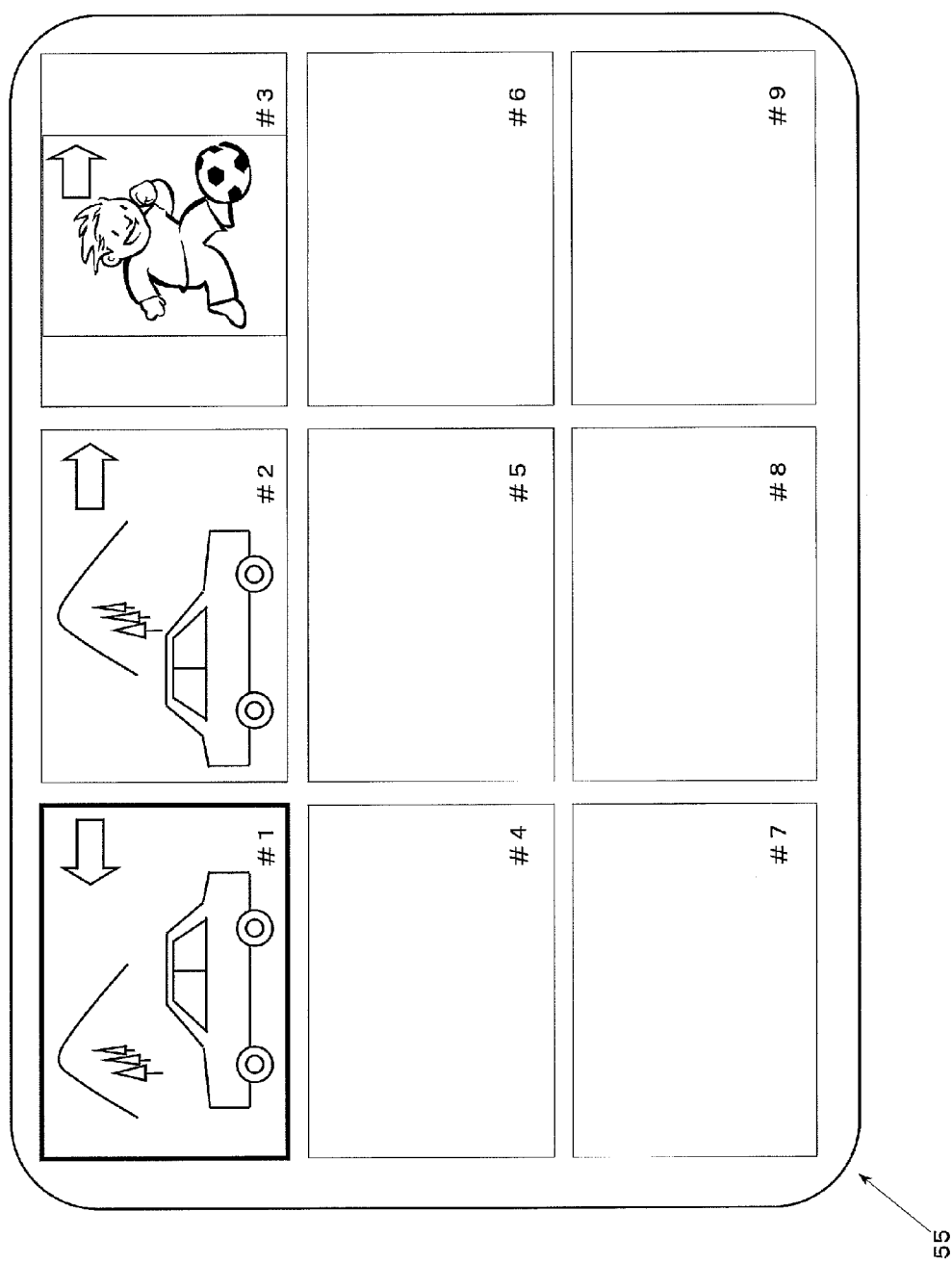
FIG. 21 is an example of a thumbnail display by sequentially captured image folder.

As shown in FIG. 21, nine thumbnail images of the extracted image folders #1 to #9 are displayed on the display unit 55 (S11). These extracted image folders contain the panning mode signal 60 and the orientation determination signal 61 along with the extracted images. For example, the plurality of extracted images stored in the extracted image folder (#1) 97a are extracted images produced from a moving picture captured while panning to the left, of an automobile moving to the left, while the digital camera 1 is in landscape orientation. Therefore, along with these extracted images, "0" is recorded as the orientation determination signal 61, and "1" as the panning mode signal 60. The front extracted image (the extracted image acquired at the earliest imaging time) is displayed in thumbnail as an extracted image.

Also, the plurality of extracted images stored in the extracted image folder (#2) 97b are extracted images produced from a moving picture captured while panning to the right, of an automobile moving to the right, with the digital camera 1 in landscape orientation. Therefore, along with these extracted images, a "0" is recorded as the orientation determination signal 61, and a "2" as the panning mode signal 60.

The thumbnail images for the extracted image folder (3#) 97c are extracted images produced from a moving picture captured while panning to the right over a child moving to the right, with the digital camera 1 in portrait orientation. Therefore, a "1" is recorded as the orientation determination signal 61, and a "2" as the panning mode signal 60. The front extracted image is displayed in thumbnail as an extracted image on the display unit 55.

Here, the extracted image in the thumbnail display is displayed on the display unit 55 in a state of being restored to the same orientation as during imaging, on the basis of the orientation determination signal 61. More specifically, when the orientation determination signal 61 is "0" (in the case of thumbnail images of the extracted image folder (#1) 97a and (#2) 97b shown in FIG. 21), the moving picture is captured in landscape orientation. Therefore, a control signal is sent from the microcomputer 3 to the image display controller 13, and the operation of the display unit 55 is controlled by the image display controller 13, so that a horizontal image will be displayed on the display unit 55 when the digital camera 1 is in landscape orientation. As a result, an image is displayed in horizontal format on the display unit 55. Also, when the orientation determination signal 61 is "1" (in the case of thumbnail images of the extracted image folder (3#) 97c shown in FIG. 21), the image is captured in portrait orientation. Therefore, just as when the orientation determination signal 61 is "0," a vertical image (an image rotated 90°) is displayed on the display unit 55 when the digital camera 1 is in landscape orientation. In FIG. 21, the thumbnail images for extracted image folders #4 to #9 are not depicted. As shown in FIG. 21, the panning mode signal 60 may be displayed with an arrow, for example, in the extracted image, so that the movement direction can be seen. The size of the arrow may also be varied according to the speed of panning. More specifically, the size may be varied such that higher the speed is, the longer or wider the arrow is.

Figure 19:
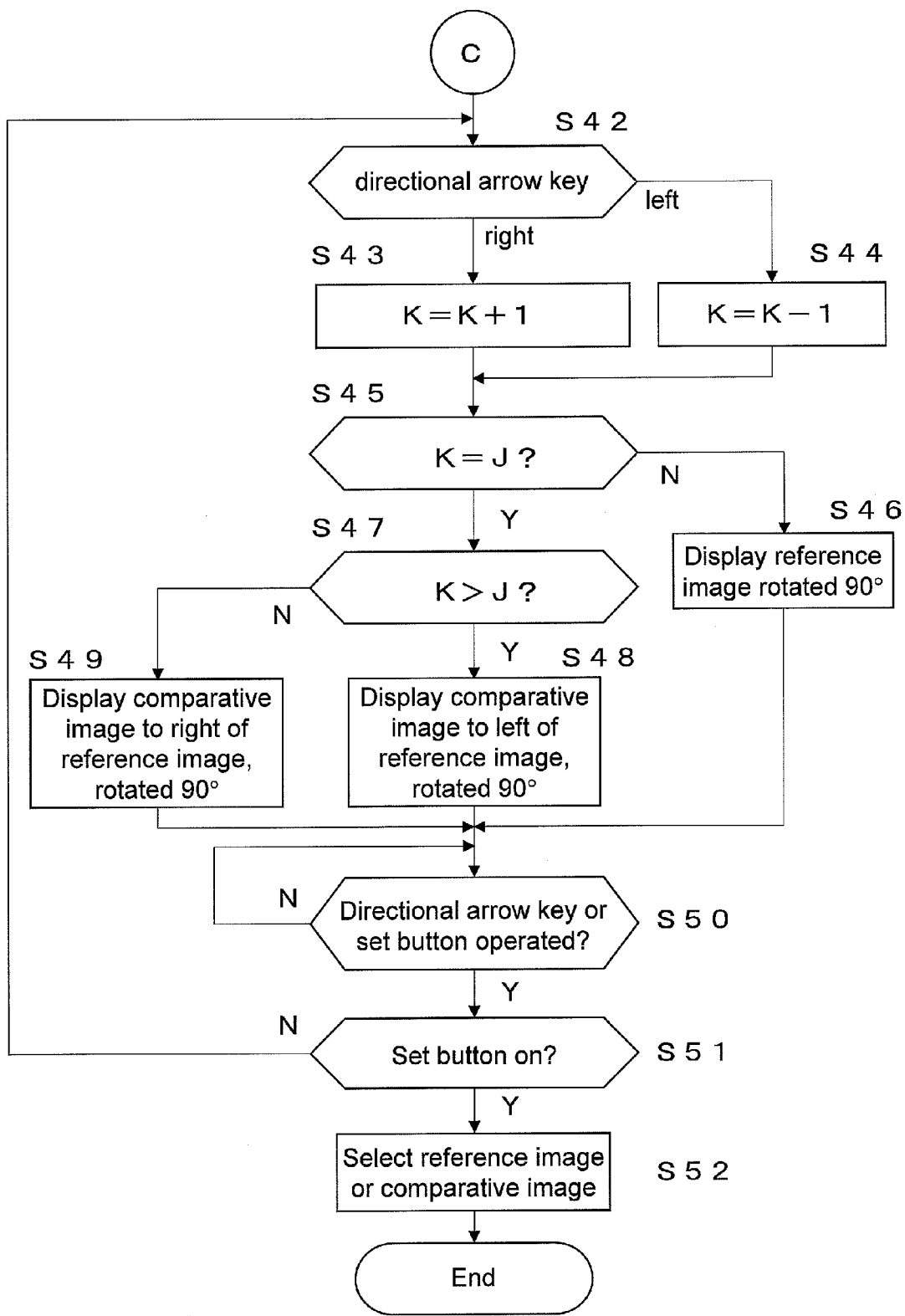
FIG. 19 is a flowchart illustrating a reproduction method.
Figure 22:
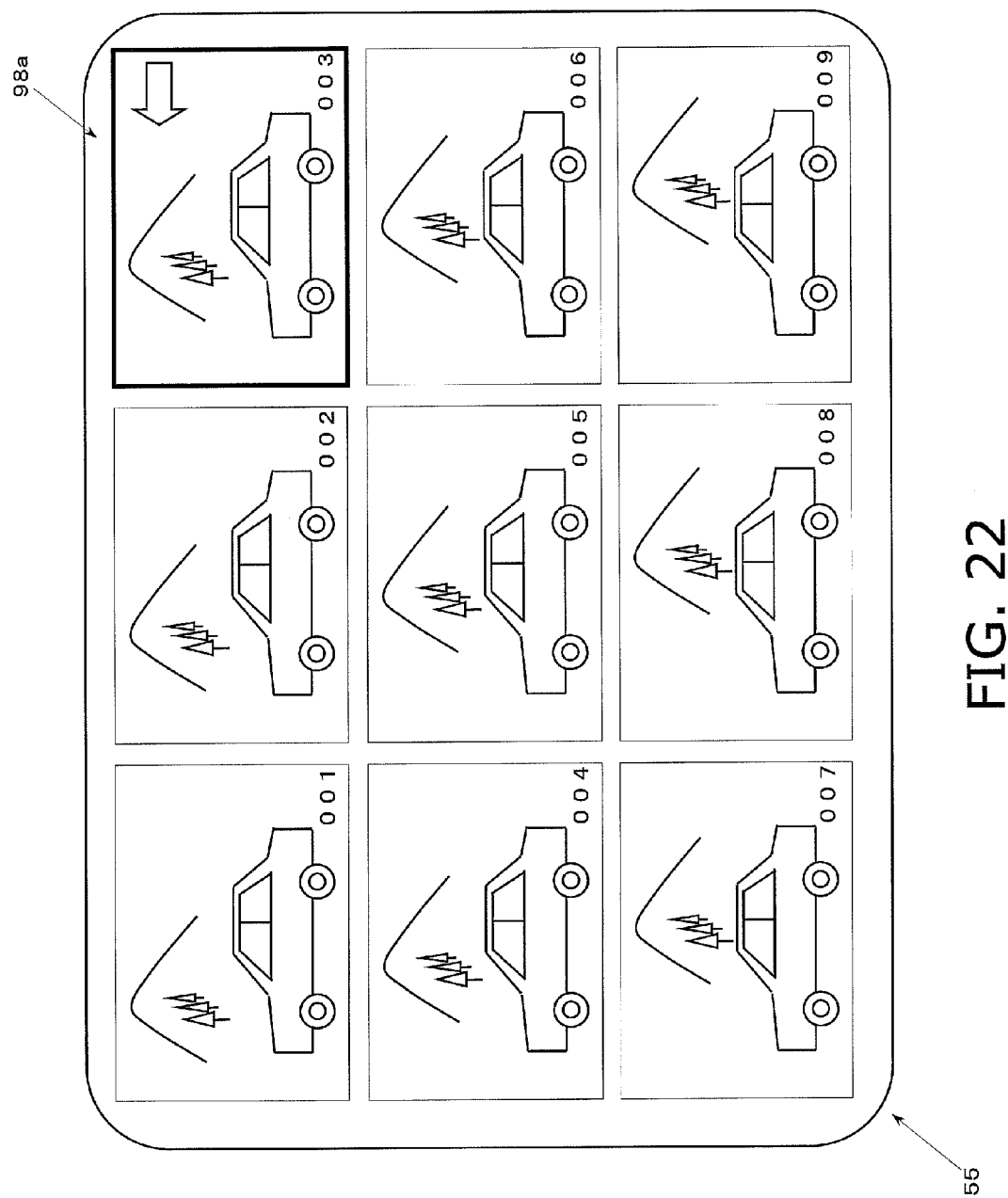
FIG. 22 is an example of a thumbnail display of sequentially captured images.

Next, the directional arrow key 38 is used to select an extracted image folder from among the front images in thumbnail display (S 12). The folder is selected using the directional arrow key 38 and the set button 40. When the extracted image folder (#1) 97a shown in FIG. 19 is selected, the nine extracted images in the extracted image folder (#1) 97a (the extracted image group 98a) are displayed on the display unit 55 as shown in FIG. 22 (S13). A three-digit number that is added to the file name is displayed in the lower-right corner of each extracted image. As discussed above, this number expresses whether extracted images are earlier or later than other extracted images. As shown in FIG. 22, the panning mode signal 60 may be displayed with an arrow, for example, in the extracted image group 98a, so that the movement direction can be seen. The size of the arrow may also be varied according to the speed of panning. More specifically, the size may be varied such that higher the speed is, the longer or wider the arrow is.

Next, the directional arrow key 38 and the set button 40 are used to select the image that will serve as a reference (the reference image) (S14). At this point, the microcomputer 3 inputs the number of the reference image to a reference number J, and inputs the reference number J to a comparative number K (S15, S16). For instance, let us assume that the extracted image file "98a003.jpg" has been selected as the reference image. In this case, J="003" and K="003."

To optimize the display layout of the images according to the panning operation during imaging, the microcomputer 3 confirms the panning mode signal 60 (S17). More specifically, the microcomputer 3 determines whether the panning mode signal 60 is "1," "4," or "7" (S17). These panning mode signals 60 mean that the panning is at least to the left, so if this condition is met, the layout of images is adjusted by the microcomputer 3 via the image display controller 13 so that the time vector of the images disposed side by side faces to the left. If this condition is not met, the layout of images is adjusted by the microcomputer 3 via the image display controller 13 so that the time vector of the images disposed side by side faces to the right.

The selection and determination of the images was performed using the directional arrow key 38 and the set button 40, but the display unit 55 may be configured as a touch panel, which the user operates by touching the panel with a finger. In other words, the configuration can be such that the user changes the page feed direction of the images (forward or backward), the page feed speed, or the like by touching the panel with a finger, which allows for more intuitive operation.

After confirmation of the panning mode signal 60, confirmation of the orientation determination signal 61 is performed (S18, S19). More specifically, the microcomputer 3 determines whether or not the orientation determination signal 61 is "0" (S18, S19). If the orientation determination signal 61 is "0," imaging of the moving picture is performed in landscape orientation, so a horizontal image is displayed on the display unit 55 to restore the orientation to that during imaging. On the other hand, if the orientation determination signal 61 is "1," imaging of the moving picture is performed in portrait orientation, so a vertical image is displayed on the display unit 55 in a state of being rotated by 90° to restore the orientation to that during imaging.

The flow of the various conditions in step S17 will now be described in detail.

A) In Landscape Orientation

When the Panning Horizontal Component is "To the Left"

Figure 17:
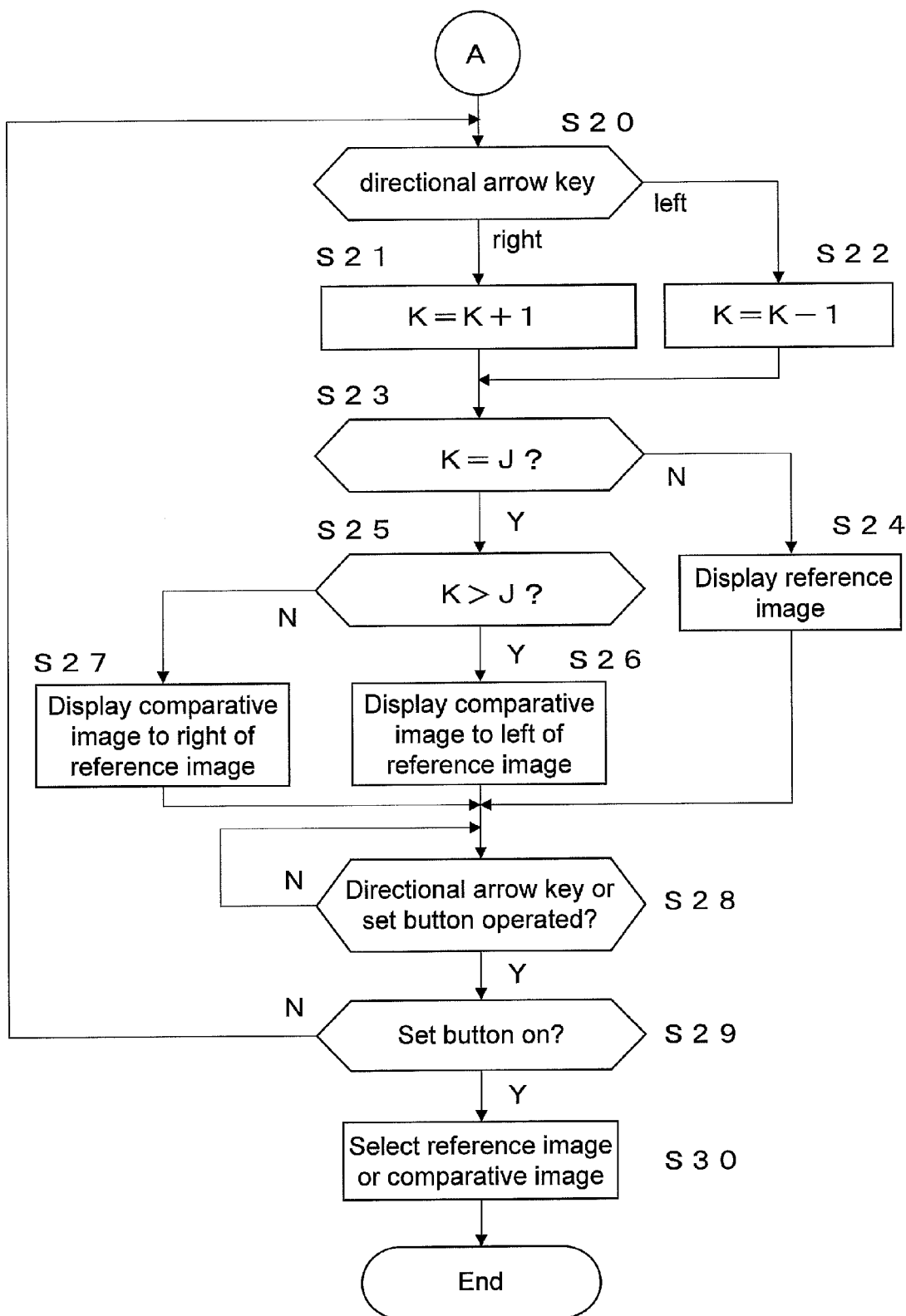
FIG. 17 is a flowchart illustrating a reproduction method.

When the microcomputer 3 determines that the panning mode signal 60 in step S17 is either "1," "4," or "7," and the microcomputer 3 determines that the orientation determination signal 61 in step S18 is "0," image display is performed on the basis of flow A shown in FIG. 17. More specifically, as shown in FIG. 17, a comparative image is selected with the directional arrow key 38. For example, when the directional arrow key 38 (or a dial disposed on the outer peripheral side of the directional arrow key 38) is operated to the right, the microcomputer 3 adds 1 to the comparative number K and sets a new comparative number K (S20, S21). On the other hand, if the directional arrow key 38 (or dial) is operated to the left, the microcomputer 3 subtracts 1 from the comparative number K and sets a new comparative number K (S20, S22).

Figure 23:
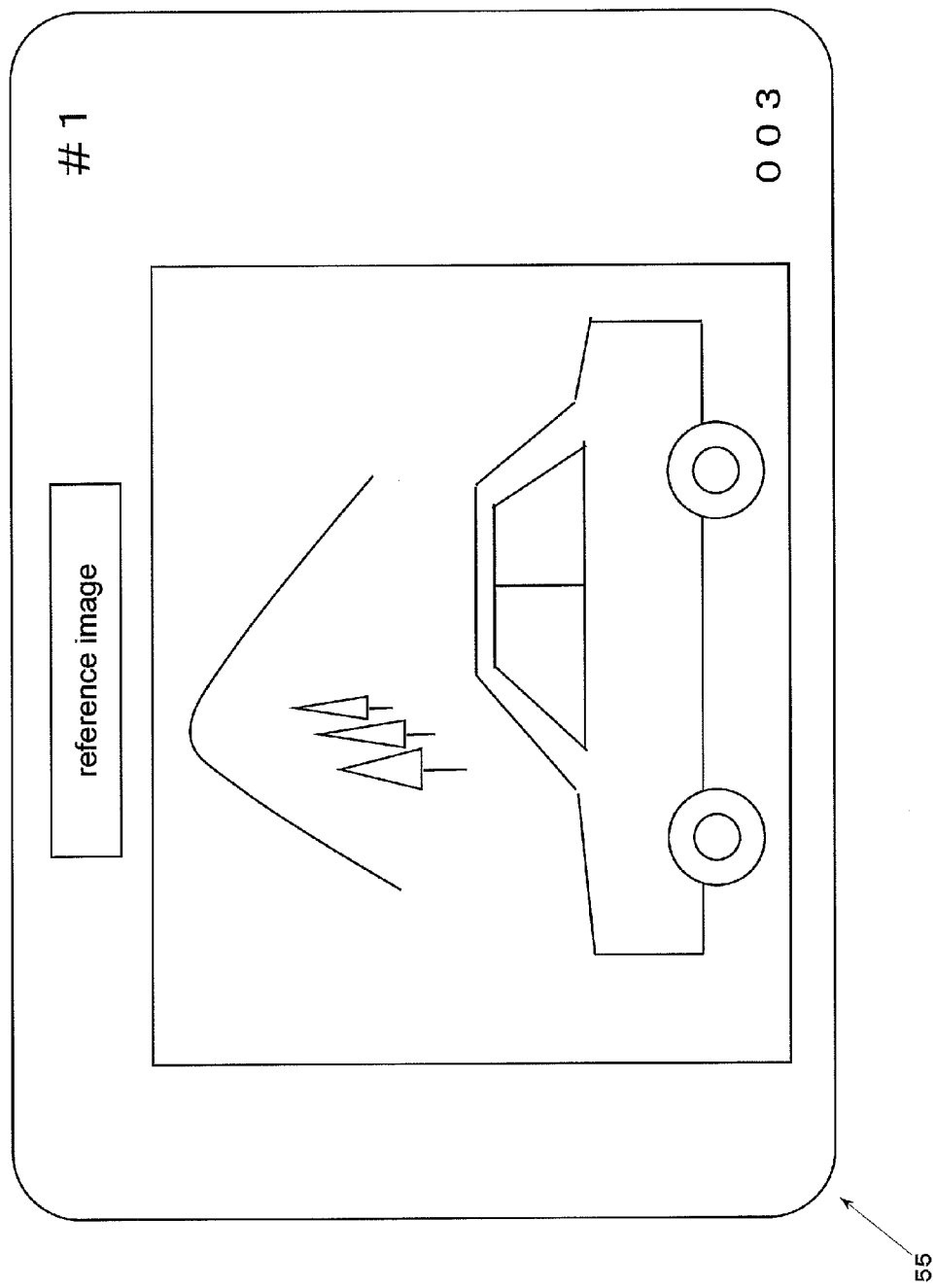
FIG. 23 is a display example of a reference image.

Next, images are displayed on the display unit 55 by the image display controller 13 on the basis of the reference number J and the comparative number K. More specifically, as shown in FIG. 23, when the comparative number K is the same as the reference number J, only the reference image is displayed on the display unit 55 by the image display controller 13 (S23, S24).

Meanwhile, when the reference number J differs from the comparative number K, the reference number J and the comparative number K are compared to see which is greater (S25). If the comparative number K is greater than the reference number J, then the comparative image is an image acquired at a later point in time than the reference image. In this flow, the horizontal direction component of the panning corresponds to a case of "to the left." Accordingly, the comparative image is displayed to the left of the reference image on the display unit 55 so that the orientation of the time vector when the reference image and comparative image are disposed side by side will be to the left, which is the same as the horizontal direction component of the panning (S26). Since the imaging orientation at this point is landscape, the image displayed is in a horizontal state.

If the comparative number K is less than the reference number J, the comparative image is an image acquired at an earlier point in time than the reference image. Accordingly, the comparative image is displayed to the right of the reference image on the display unit 55 so that the orientation of the time vector when the reference image and comparative image are disposed side by side will be to the left, which is the same as the horizontal direction component of the panning (S27). Since the imaging orientation at this point is landscape, the image displayed is in a horizontal state.

Figure 24:
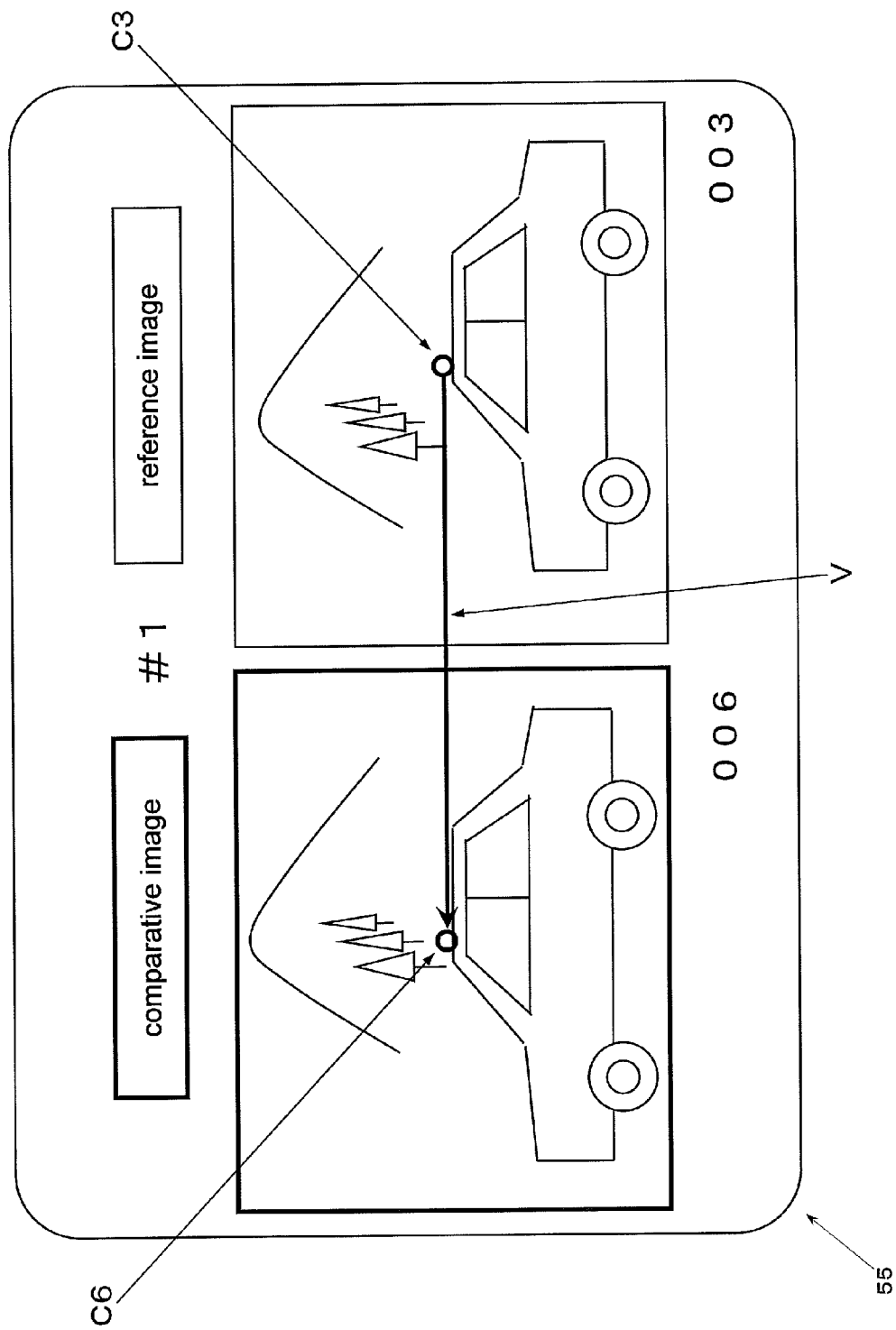
FIG. 24 is a display example of a reference image and a comparative image (extracted image folder (#1))

For instance, when the extracted image folder (#1) 97a is selected, the panning mode signal 60 is "1" as mentioned above, so processing is carried out according to this flow A. If we let the reference number J="003" and the comparative number K="006," then K>J. Accordingly, as shown in FIG. 24, the comparative image 006 (extracted image file "98a006.jpg") is displayed to the left of the reference image 003 (extracted image file "98a003.jpg") on the display unit 55. In this case, the time vector V extending from the center C3 of the reference image to the center C6 of the comparative image substantially coincides with the direction of the panning.

Figure 25:
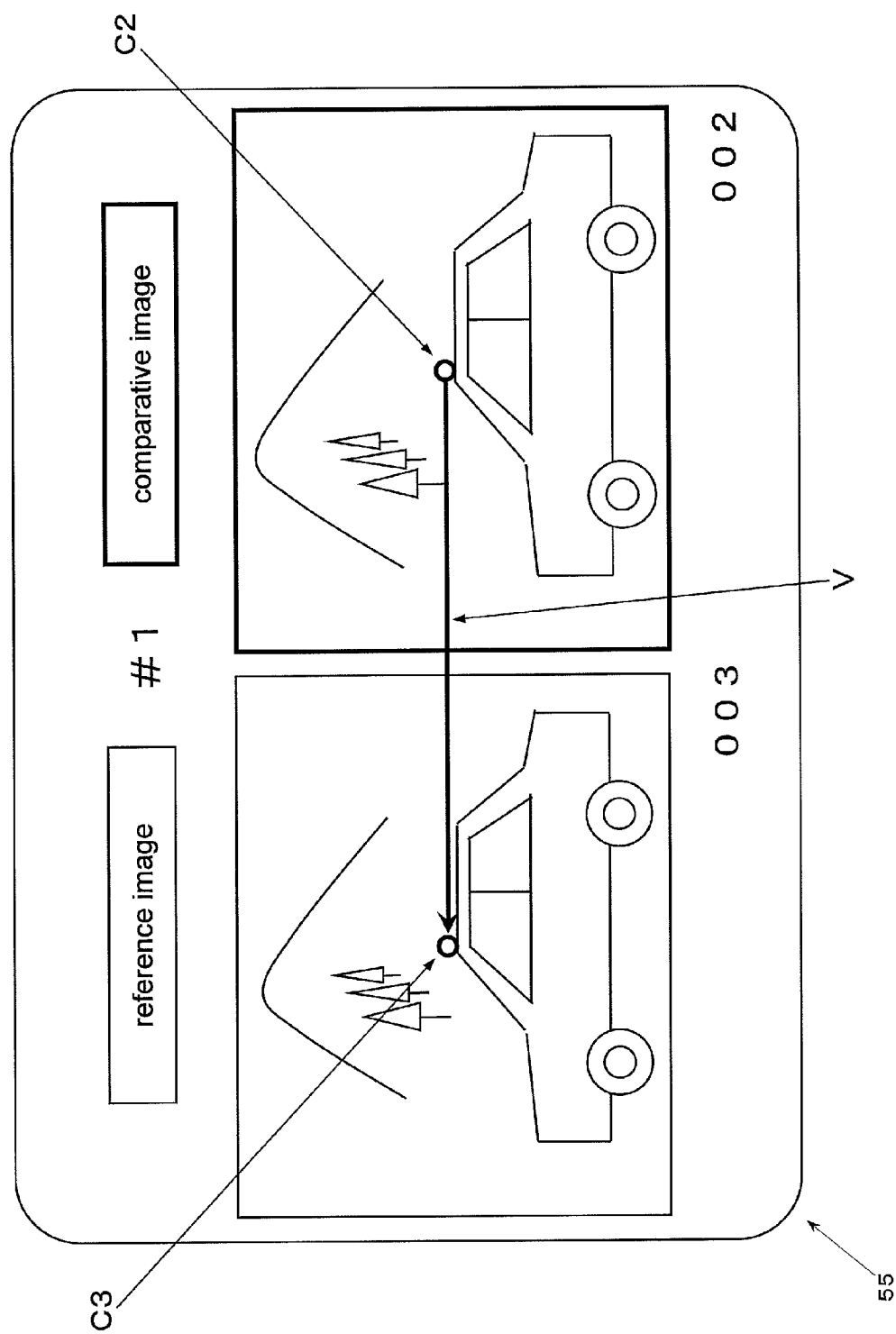
FIG. 25 is a display example of a reference image and a comparative image (extracted image folder (#1))

If the comparative number K="002," then K<J, so as shown in FIG. 25, the comparative image 002 (extracted image file "98a002.jpg") is displayed to the right of the reference image 003 (extracted image file "98a003.jpg") on the display unit 55. In this case, the time vector V extending from the center C2 of the comparative image to the center C3 of the reference image substantially coincides with the direction of the panning.

Thus, with this digital camera 1, in the display of a plurality of extracted images produced from a moving picture, the layout of images is automatically adjusted by the microcomputer 3 so that the direction of panning (the movement direction of the subject) substantially coincides with the direction in which the images are laid out. Accordingly, a display state can be obtained which makes it easier for the user to check a plurality of still pictures, and the images laid out side by side will look more natural.

As shown in FIG. 17, when the image display operation is complete, the camera enters a state of awaiting operation of the directional arrow key 38 or the set button 40 (S28). When the set button 40 is operated, if a reference image and a comparative image are displayed on the display unit 55 at that point, then the user uses the directional arrow key 38 and the set button 40 to select one of the images as the selected image (S29, S30). The zoom lever 57 can be operated, for example, to enlarge or reduce the size of the selected image. If just a reference image is displayed, then the reference image is automatically selected as the selected image.

If the directional arrow key 38 is operated, but not the set button 40, the flow goes back to step S18, and the operations of steps S18 to S28 are repeated (S29).

When the Panning Horizontal Component is "To the Right" or "None"

Figure 18:
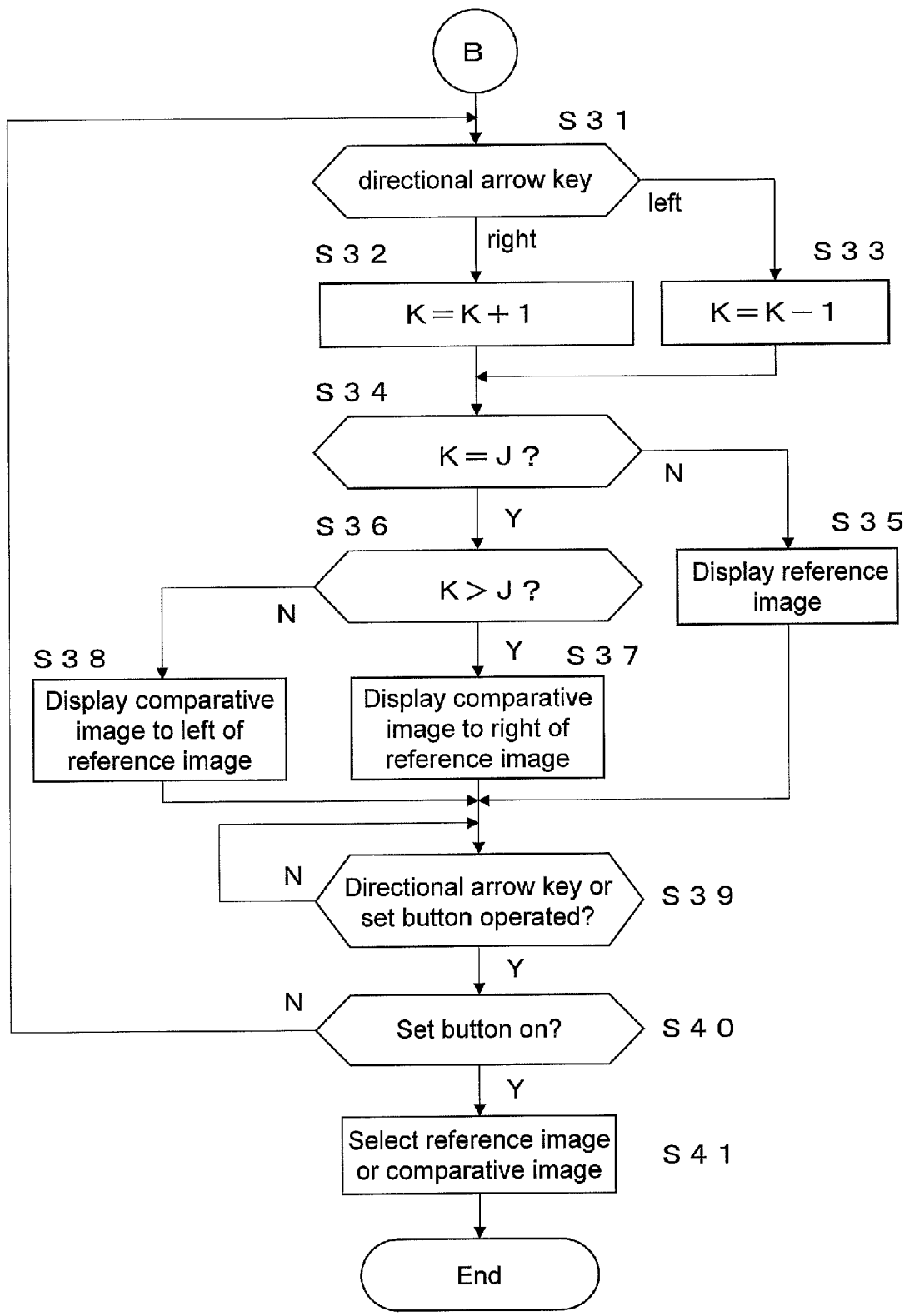
FIG. 18 is a flowchart illustrating a reproduction method.

If the microcomputer 3 determines that the panning mode signal 60 in step S17 is neither "1," "4," nor "7," and the microcomputer 3 determines that the orientation determination signal 61 in step S19 is "0," then image display is performed on the basis of the flow B shown in FIG. 18. More specifically, as shown in FIG. 17, a comparative image is selected using the directional arrow key 38. For example, when the directional arrow key 38 (or a dial disposed on the outer peripheral side of the directional arrow key 38) is operated to the right, the microcomputer 3 adds 1 to the comparative number K and sets a new comparative number K (S31, S32). On the other hand, if the directional arrow key 38 (or dial) is operated to the left, the microcomputer 3 subtracts 1 from the comparative number K and sets a new comparative number K (S31, S33).

Next, images are displayed on the display unit 55 by the image display controller 13 on the basis of the reference number J and the comparative number K. More specifically, when the comparative number K is the same as the reference number J, only the reference image is displayed on the display unit 55 by the image display controller 13 (S34, S35).

Meanwhile, when the reference number J differs from the comparative number K, the reference number J and the comparative number K are compared to see which is greater (S36). If the comparative number K is greater than the reference number J, then the comparative image is an image acquired at a later point in time than the reference image. In this flow B, the horizontal direction component of the panning corresponds to a case of "to the right" or "none." Accordingly, the comparative image is displayed to the right of the reference image on the display unit 55 so that the orientation of the time vector when the reference image and comparative image are disposed side by side will be to the right, which is the same as the horizontal direction component of the panning (S37). Since the imaging orientation at this point is landscape, the image displayed is in a horizontal state.

If the comparative number K is less than the reference number J, the comparative image is an image acquired at an earlier point in time than the reference image. Accordingly, the comparative image is displayed to the left of the reference image on the display unit 55 so that the orientation of the time vector when the reference image and comparative image are disposed side by side will be to the right, which is the same as the horizontal direction component of the panning (S38). Since the imaging orientation at this point is landscape, the image displayed is in a horizontal state.

Figure 26:
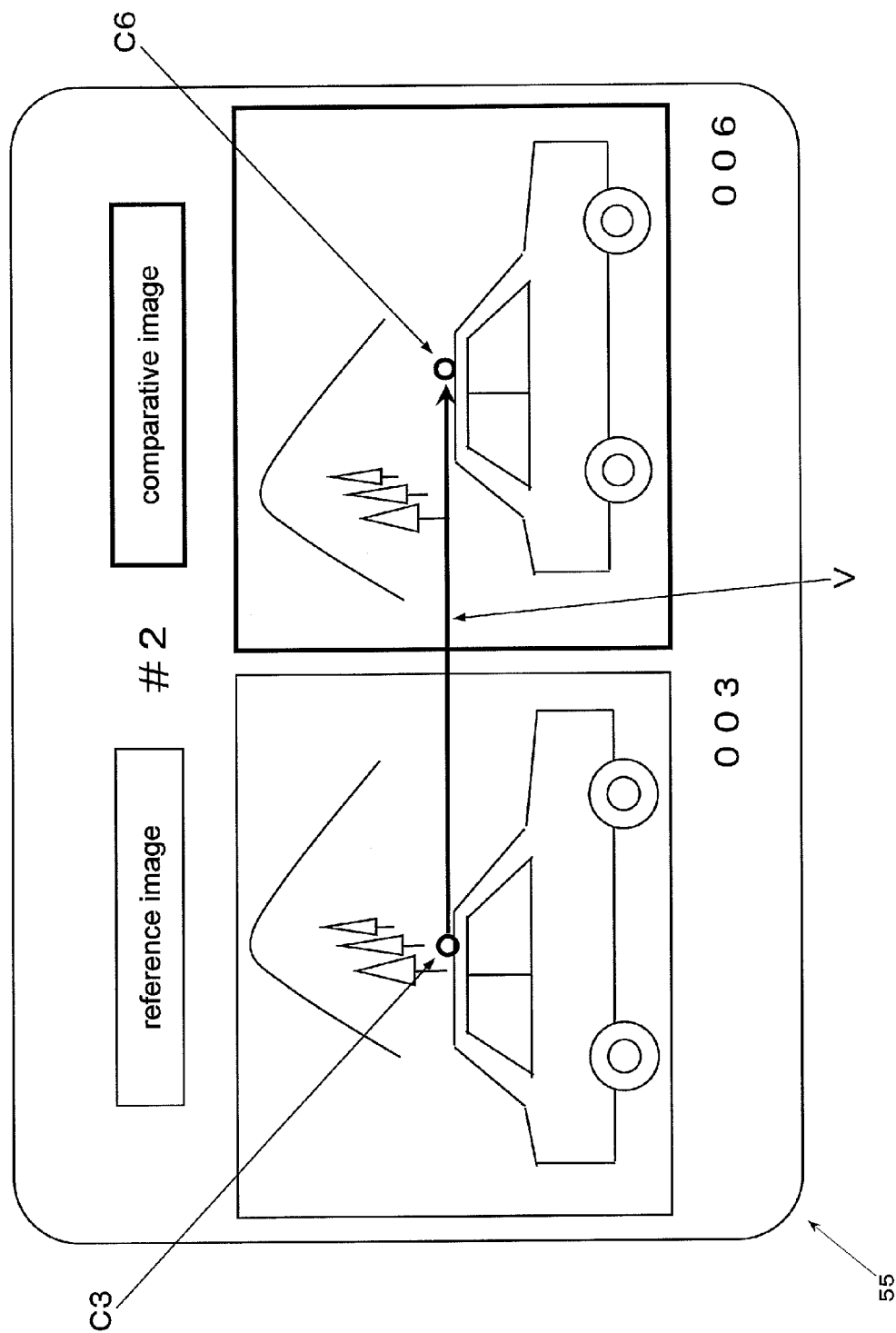
FIG. 26 is a display example of a reference image and a comparative image (extracted image folder (#2))

For instance, when the extracted image folder (#2) 97*b* is selected, the panning mode signal 60 is "1" as mentioned above, so processing is carried out according to this flow B. If we let the reference number J="003" and the comparative number K="006," then K>J. Accordingly, as shown in FIG. 26, the comparative image 006 is displayed to the right of the reference image 003 on the display unit 55.

Thus, with this digital camera 1, in the display of a plurality of extracted images produced from a moving picture, the layout of images is automatically adjusted by the microcomputer 3 so that the movement direction of the subject substantially coincides with the direction in which the images are laid out. Accordingly, a display state can be obtained which makes it easier for the user to check a plurality of still pictures.

When the image display operation is complete, the camera enters a state of awaiting operation of the directional arrow key 38 or the set button 40 (S39). When the set button 40 is operated, if a reference image and a comparative image are displayed on the display unit 55 at that point, then the user uses the directional arrow key 38 and the set button 40 to select one of the images as the selected image (S40, S41). The zoom lever 57 can be operated, for example, to enlarge or reduce the size of the selected image. If just a reference image is displayed, then the reference image is automatically selected as the selected image.

If the directional arrow key 38 is operated, but not the set button 40, the flow goes back to step S31, and the operations of steps S31 to S39 are repeated (S40).

B) In Portrait Orientation

When the Panning Horizontal Component is "To the Left"

Flow C shown in FIG. 19 comprises basically the same steps as flow A discussed above, but differs from flow A in that in steps S46, S48, and S49 the images are displayed in a state of being rotated by 90°. This is because it is determined in step S18 that the imaging orientation is portrait. The other steps S42 to S45, S47, and S50 to S52 are the same as the corresponding steps of flow A discussed above, and so will not be described again in detail.

When the Panning Horizontal Component is "To the Right" or "None"

Figure 20:
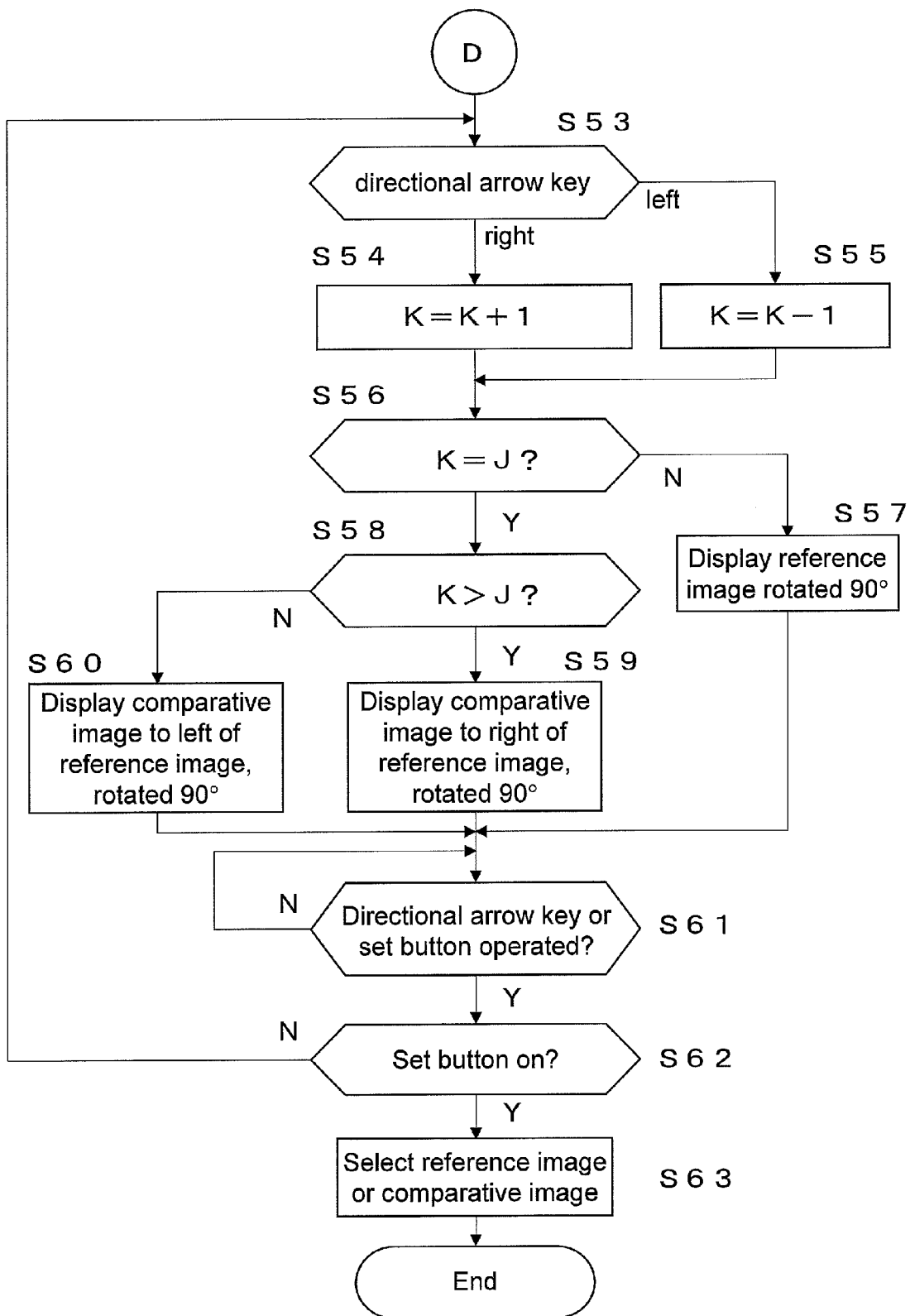
FIG. 20 is a flowchart illustrating a reproduction method.

Flow D shown in FIG. 20 comprises basically the same steps as flow B discussed above, but differs from flow B in that in steps S57, S59, and S60 the images are displayed in a state of being rotated by 90°. This is because it is determined in step S19 that the imaging orientation is portrait. The other steps S53 to S56, S58, and S61 to S63 are the same as the corresponding steps of flow B discussed above, and so will not be described again in detail.

Figure 27:
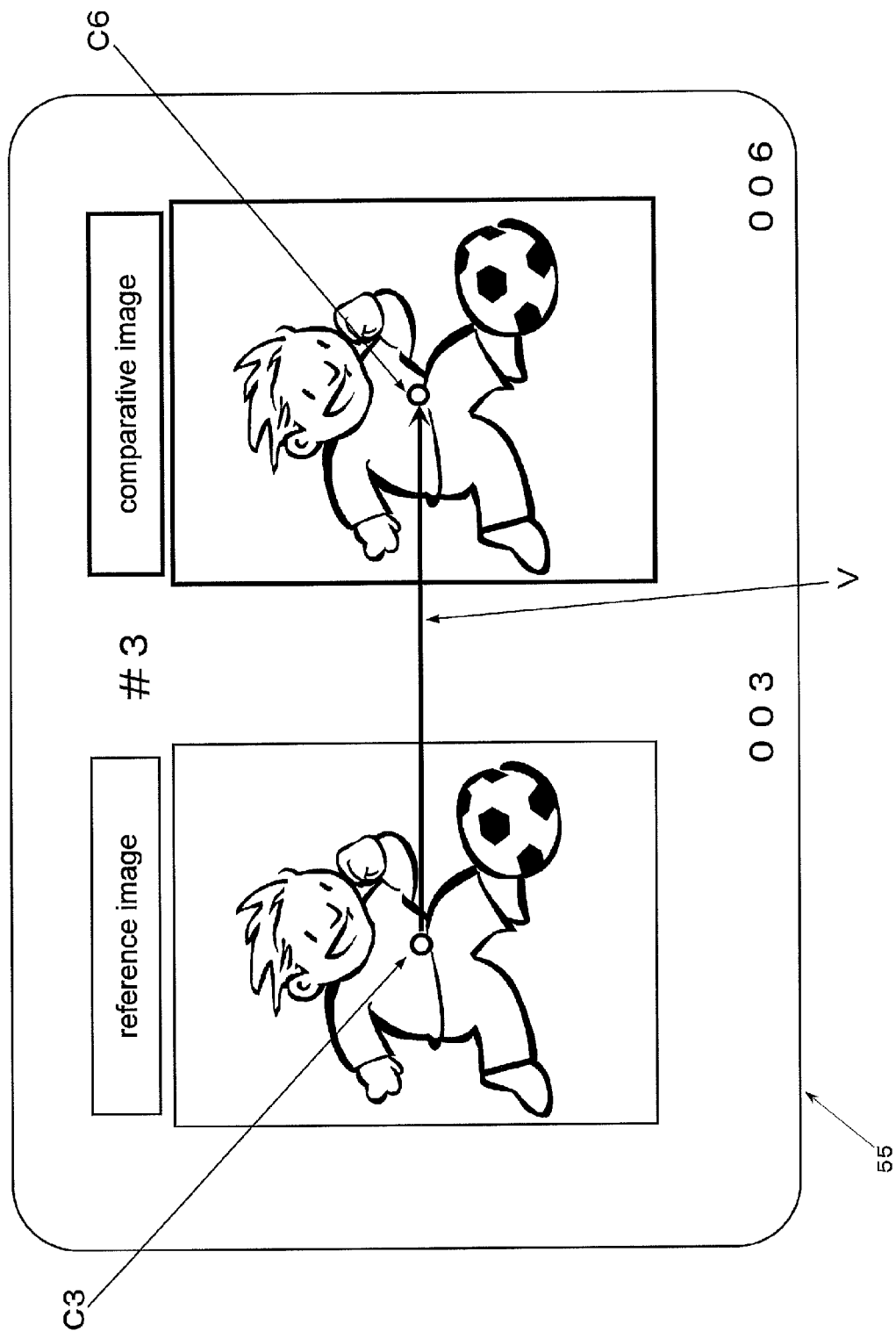
FIG. 27 is a display example of a reference image and a comparative image (extracted image folder (#3))

For example, when the extracted image folder (3#) is selected, the palming mode signal 60 is "1" and the orientation determination signal 61 is "1," so processing is carried out according to this flow D. If we let the reference number J="003" and the comparative number K="006," then K>J. Accordingly, as shown in FIG. 27, the comparative image 006 is displayed to the right of the reference image 003 on the display unit 55. Since the imaging orientation here is portrait, the images are displayed in a state of being rotated by 90°.

Thus, in flows C and D, since the images are displayed on the display unit 55 in a state in which the orientation is restored to that during imaging, it is even easier for the user to check the images.

Features

The features of the digital camera 1 are as follows.

(1)

With this digital camera 1, the microcomputer 3 produces a plurality of extracted images from a moving picture, and the microcomputer 3 also determines the layout of the plurality of extracted images on the basis of a panning mode signal 60 serving as first movement information. Accordingly, the layout of images can be adjusted to match the movement of the digital camera 1 or the movement of the subject in the moving picture. Consequently, the direction in which the extracted images are laid out can be made to coincide substantially with the direction of movement, which makes the plurality of images displayed side by side look more natural.

(2)

With this digital camera 1, the layout of a plurality of extracted images is determined by the microcomputer 3 so that the orientation of the time vector formed by two adjacent extracted images will substantially coincide with one component of the direction of movement included in movement information. Consequently, one component of the direction in which the digital camera 1 moves can be made to coincide substantially with the direction of the time vector.

The term "time vector" here means a vector extending from the center of a previously acquired extracted image toward the center of a subsequently acquired extracted image when two extracted images acquired at different times are put side by side. The phrase "the orientation of the time vector will substantially coincide with one component of the direction of movement" encompasses both a case in which the orientation of the time vector perfectly coincides with one component of the direction of movement, as well as a case in which the orientation of the time vector deviates from one component of the direction of movement to an extent that the effect of reducing confusion regarding the displayed still pictures can still be ensured. Therefore, in the case shown in FIG. 24, for example, if the user pans the digital camera 1 upward and to the left or downward and to the left, it can still be said that the orientation of the time vector substantially coincides with one component (the horizontal component) of the direction in which the digital camera 1 moves.

(3)

With this digital camera 1, the vertical and horizontal components of panning are detected by the angular velocity sensors 17*x* and 17*y*. Furthermore, the panning mode signal 60 is automatically produced by the microcomputer 3 on the basis of these detection results, and the panning mode signal 60 is recorded to the image recorder 12 along with a plurality of extracted images or a moving picture. As a result, the angular velocity sensors 17*x* and 17*y* used for blur correction can be utilized as part of the detection component used for producing the panning mode signal 60.

(4)

With this digital camera 1, the state in which the images are displayed on the display unit 55 is adjusted by the microcomputer 3 and the image display controller 13 so that the top-bottom direction in the images when the images are displayed on the display unit 55 substantially coincides with the vertical direction. That is, the images are displayed on the display unit 55 in the same state as that during imaging. Accordingly, the top-bottom direction of the actual subject and the top-bottom direction of the subject in the images can be made to coincide substantially, which allows any unnaturalness of the displayed images to be reduced.

Second Embodiment

Figure 28:
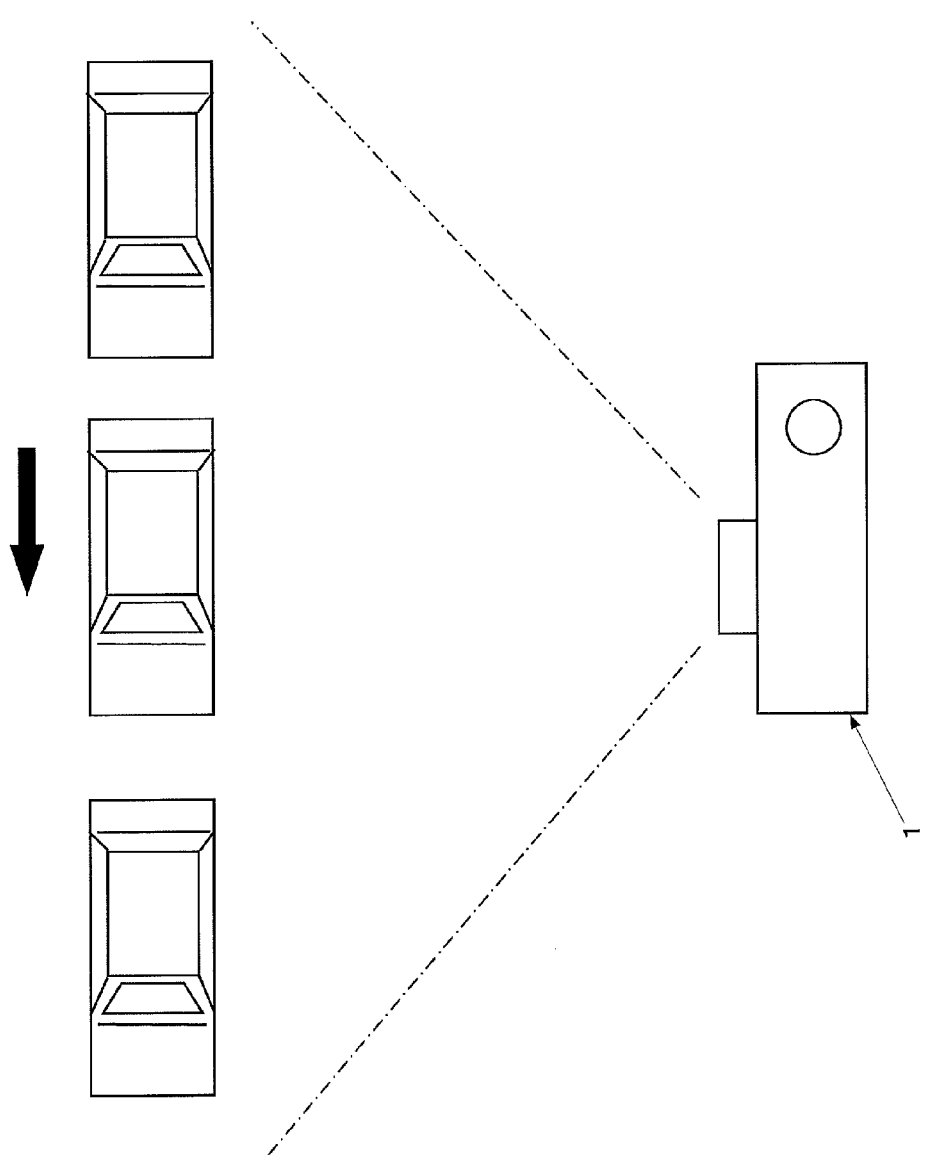
FIG. 28 is a diagram illustrating a panning imaging state (second embodiment)
Figure 29:
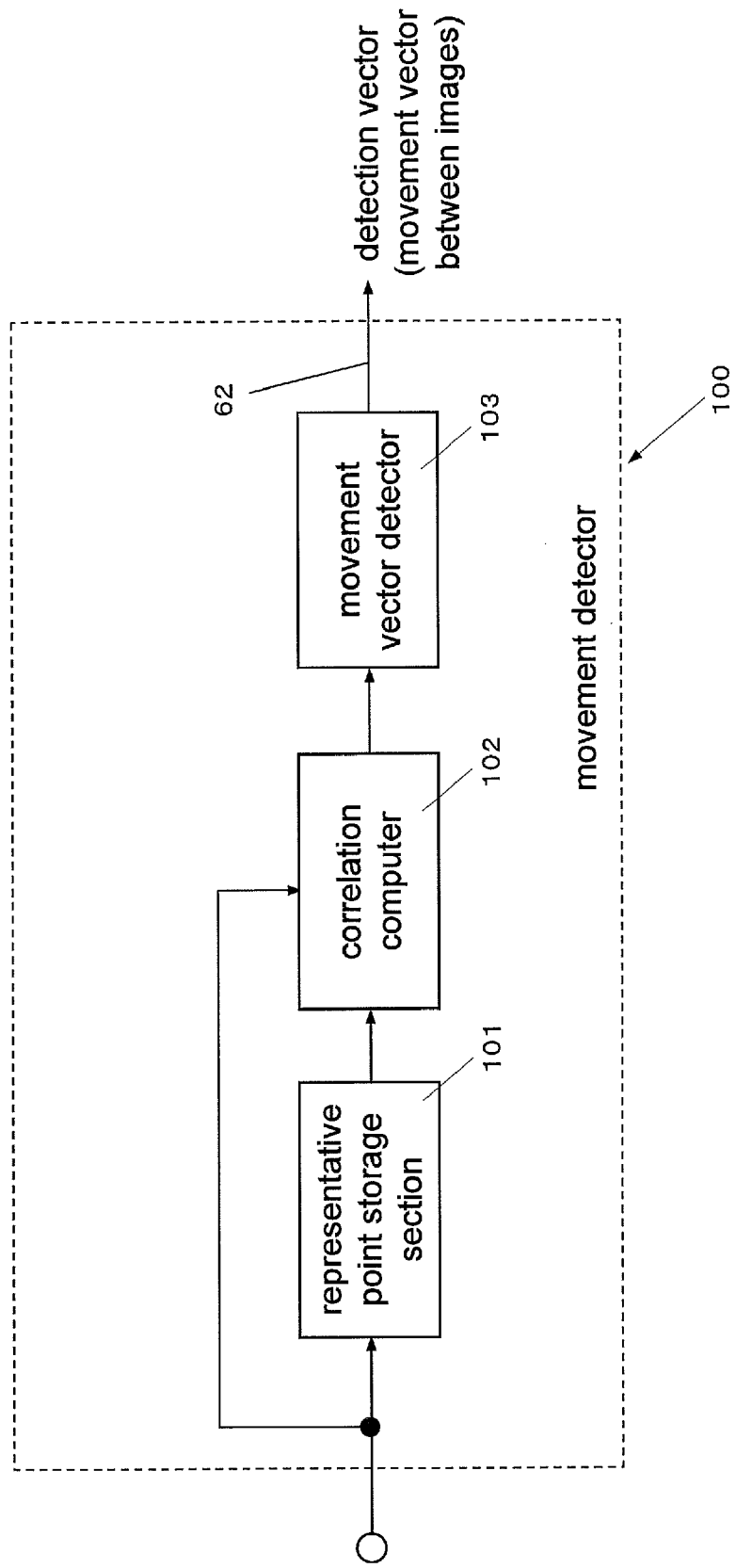
FIG. 29 is a diagram of the hardware configuration of a movement vector detector (second embodiment)

In the embodiment given above, a case was described of panning the digital camera 1 to capture a moving picture. However, as shown in FIG. 28, it is also conceivable that a moving subject is imaged without panning the digital camera 1. FIG. 29 is a block diagram illustrating an example of the configuration of a movement detector. Those components that have substantially the same function as in the above embodiment are numbered the same, and will not be described again.

FIG. 28 depicts a situation in which the imaging orientation of the digital camera 1 in the second embodiment is such that images of an automobile moving to the left are captured over a wide angle of view, with the imaging angle of the digital camera 1 substantially the same. Here, instead of the panning mode signal 60 used in the first embodiment, the layout of images is determined on the basis of the movement vector of the subject detected from the moving picture. More specifically, just as with the panning mode signal 60 shown in FIG. 5, a movement vector signal 62 (FIG. 29) that indicates movement of the subject is produced by a movement detector 100 and the microcomputer 3.

More specifically, as shown in FIG. 29, the movement detector 100 is a unit for detecting movement of the subject within images on the basis of a moving picture, and has a representative point storage section 101, a correlation computer 102, and a movement vector detector 103.

The representative point storage section 101 divides an image signal for the current frame inputted via the A/D converter 7 and the digital signal processor 8 into a plurality of regions, and stores the image signals corresponding to a specific representative point included in each region as representative point signals. The representative point storage section 101 reads the representative point signal one frame ahead of the current frame that has already been stored, and outputs it to the correlation computer 102.

The correlation computer 102 computes the correlation between the representative point signal one frame earlier and the representative point signal of the current frame, and compares the difference between the representative point signals. The computation result is outputted to the movement vector detector 103.

The movement vector detector 103 detects the movement vector of an image between one frame earlier and the current frame, in single pixel units, from the computation result supplied by the correlation computer 102. The movement vector is then outputted to the microcomputer 3. The microcomputer 3 adjusts the movement vector for gain, phase, etc., and calculates the direction and speed of movement per unit of time of the subject in the image signal. Depending on the direction in which the subject is moving, the movement vector signal 62 is produced as a signal from "0" to "8," as with the panning mode signal 60 shown in FIG. 5.

Just as in the embodiment above, the layout of extracted images is determined by the microcomputer 3 on the basis of the movement vector signal 62. How this is determined is the same as in the embodiment above, and will therefore not be described again in detail.

The processing of detecting subject movement is commenced, for example, when the user starts the recording of a moving picture.

With the above configuration of the digital camera 1, a plurality of still pictures each having second movement information for each frame can be produced from a moving picture in which a movement vector signal 62 was recorded as second movement information. Furthermore, the layout of the images is determined by the microcomputer 3 on the basis of this second movement information. More specifically, the layout of the images is determined by the microcomputer 3 so that the orientation of the time vector formed by images displayed side by side will substantially coincide with the direction in which the subject is moving, on the basis of the movement vector 62. Consequently, the direction in which the subject is moving will substantially coincide with the layout of images, and there will be less unnaturalness in the plurality of images displayed side by side.

Also, a subject face detector may be provided to the digital camera 1 so that the movement vector detection can be determined on the basis of movement information about the face of the subject. In this case, the layout of images is determined by the microcomputer 3 so that the orientation of the time vector formed by images displayed side by side will substantially coincide with the orientation of the subject's face (such as facing to the left or to the right).

Also, the movement vector signal 62 may be displayed with an arrow, for example, in the displayed images to make clear the movement direction. Furthermore, the size of the arrow may also be varied according to the speed of movement. More specifically, the size may be varied such that higher the speed is, the longer or wider the arrow is.

As to the extraction of still pictures, the set button 40 may be pressed during moving picture imaging to produce still pictures along with moving picture recording, and record a movement vector signal to the still pictures thus produced.

Third Embodiment

In the second embodiment above, the movement vector is detected during moving picture imaging, but the movement vector signal 62 (an example of movement information) may be produced on the basis of a moving picture recorded to the image recorder 12. More specifically, a plurality of extracted image files are produced from a recorded moving picture file. For instance, as shown in FIGS. 9 and 10, extracted image files "98a001.jpg," "98a002.jpg," "98a003.jpg," and "98a004.jpg" are newly produced as extracted images from the first, thirty-first, sixty-first, and ninety-first frames, which are the desired frames from among the moving picture file "95a.mpg."

Next, the microcomputer 3 checks the panning mode signal 60 that indicates the movement direction of the digital camera 1. If the panning mode signal 60 is "0" (such as when imaging is performed in the state shown in FIG. 28), it is concluded that there is no panning or other such movement of the digital camera 1 during moving picture imaging, so after the production of extracted images, the movement detector 100 (an example of a movement information production section) produces a movement vector signal 62 on the basis of adjacent extracted images. The plurality of movement vector signals 62 produced by the movement detector 100 are recorded along with extracted image files to the image recorder 12.

On the other hand, if the panning mode signal 60 is not "0," it is concluded that the panning or other such movement of the digital camera 1 is occurring during moving picture imaging, so in the production of a movement vector on the basis of the moving picture, the movement vector is produced after taking the panning mode signal 60 into account. For example, as shown in FIG. 14, when moving picture imaging is performed while panning the digital camera 1 from the right to the left, a plurality of extracted images are produced as shown in FIG. 22, but the automobile that is the main subject in each of the extracted images hardly moves at all, whereas the background (such as mountains) move from left to right. In this case, the movement vector found on the basis of the plurality of extracted images is the right direction, but a vector in the reverse direction from the calculated movement vector is set by the microcomputer 3 as a new movement vector signal.

Thus, the panning mode signal 60 indicating the movement direction of the digital camera 1 is utilized to produce a movement signal by the movement detector 100 and the microcomputer 3, so panning or other such movement of the digital camera 1 will have less of an adverse effect on the movement vector found on the basis of the moving picture.

The layout of images is determined by the microcomputer 3 on the basis of the movement vector signal thus produced. More specifically, just as in the second embodiment above, the optical image is determined by the microcomputer 3 so that the orientation of the time vector formed by images displayed side by side will substantially coincide with the direction in which the subject is moving, on the basis of the movement vector signal recorded along with the extracted images (see FIG. 13, for example). Consequently, the direction in which the subject is moving can be made to coincide substantially with the layout of images, and the plurality of images displayed side by side will look more natural.

Furthermore, since there is less load on the microcomputer 3 in acquiring the moving picture than in the second embodiment above, the processing speed can be raised during moving picture acquisition.

Fourth Embodiment

Figure 30:
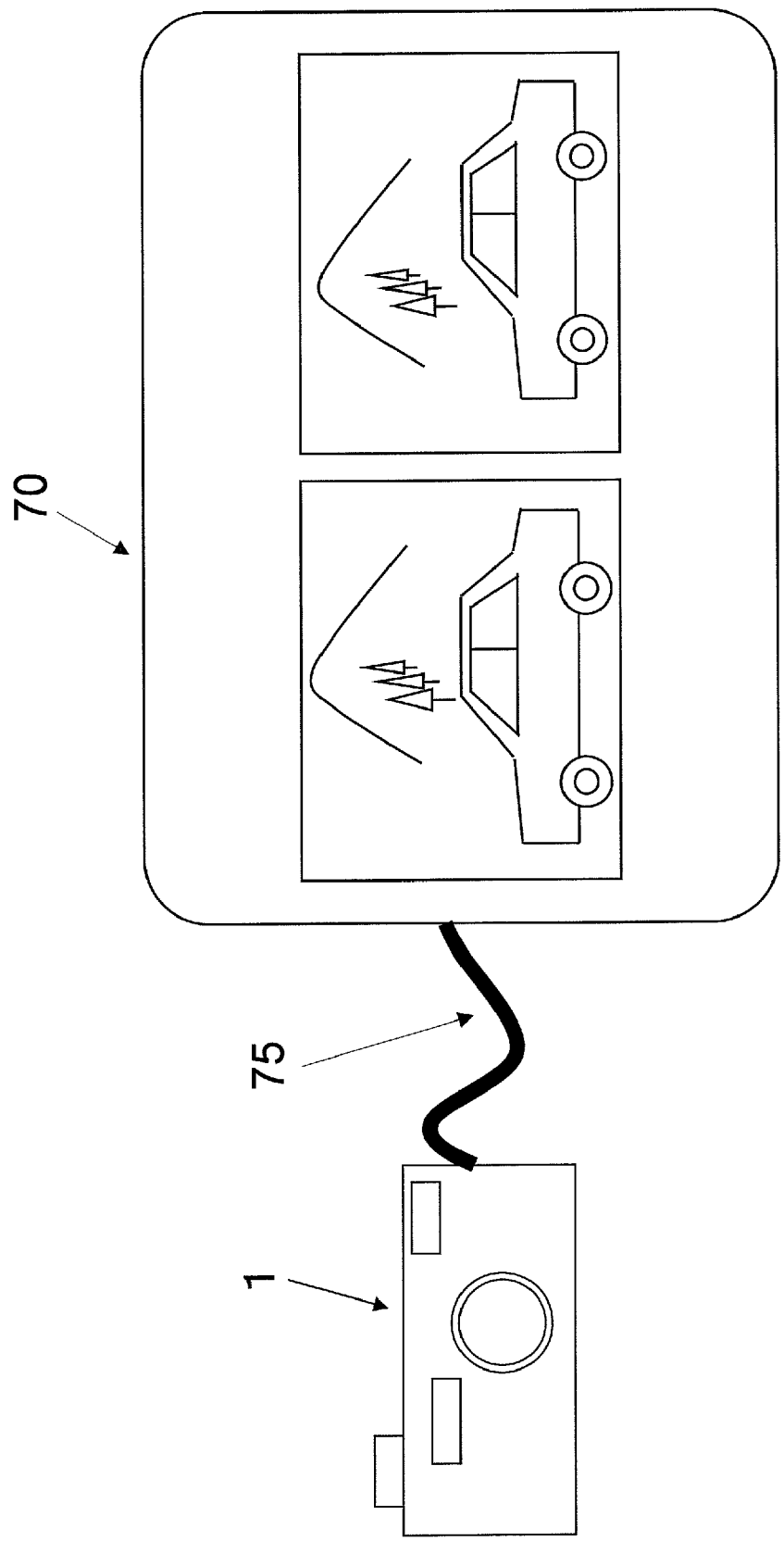
FIG. 30 is a diagram of a digital camera and a display device (fourth embodiment)

In the above embodiments the images are displayed on the display unit 55. However, as shown in FIG. 30, it is also possible for the images to be displayed on a display device 70 connected to the digital camera 1 or 101.

In this case, the only difference is that the display section has been changed from the display unit 55 to the display device 70, and this embodiment is the same as those given above in that the microcomputer 3 determines the layout of images and the display state on the basis of the panning mode signal 60, the orientation determination signal 61, the movement vector signal 62, or other such information. The display device 70 is connected to the digital camera 1 via a cable 75. The cable 75 is, for example, a USB (universal serial bus) cable.

The above configuration is valid when no display section is provided to the digital camera, or when the images are to be displayed in a larger size. This makes possible a better display that is easier to view.

Furthermore, in the fourth embodiment, a television monitor is given as an example of the external display device 70, but the device is not limited to this. For example, it may be connected via the cable 75 to a personal computer connected to a monitor.

Furthermore, in the fourth embodiment, the use of a USB cable is given as an example of the cable 75, but other options are also possible. For instance, the connection can be made with an IEEE 1394 serial bus cable, or may be a wireless connection with a wireless LAN or the like.

Fifth Embodiment

In the fourth embodiment above, the display device 70 is connected to the digital camera 1, but it is also possible for a printing device 71 to be connected instead of the display device 70 to the digital camera 1.

Figure 31:
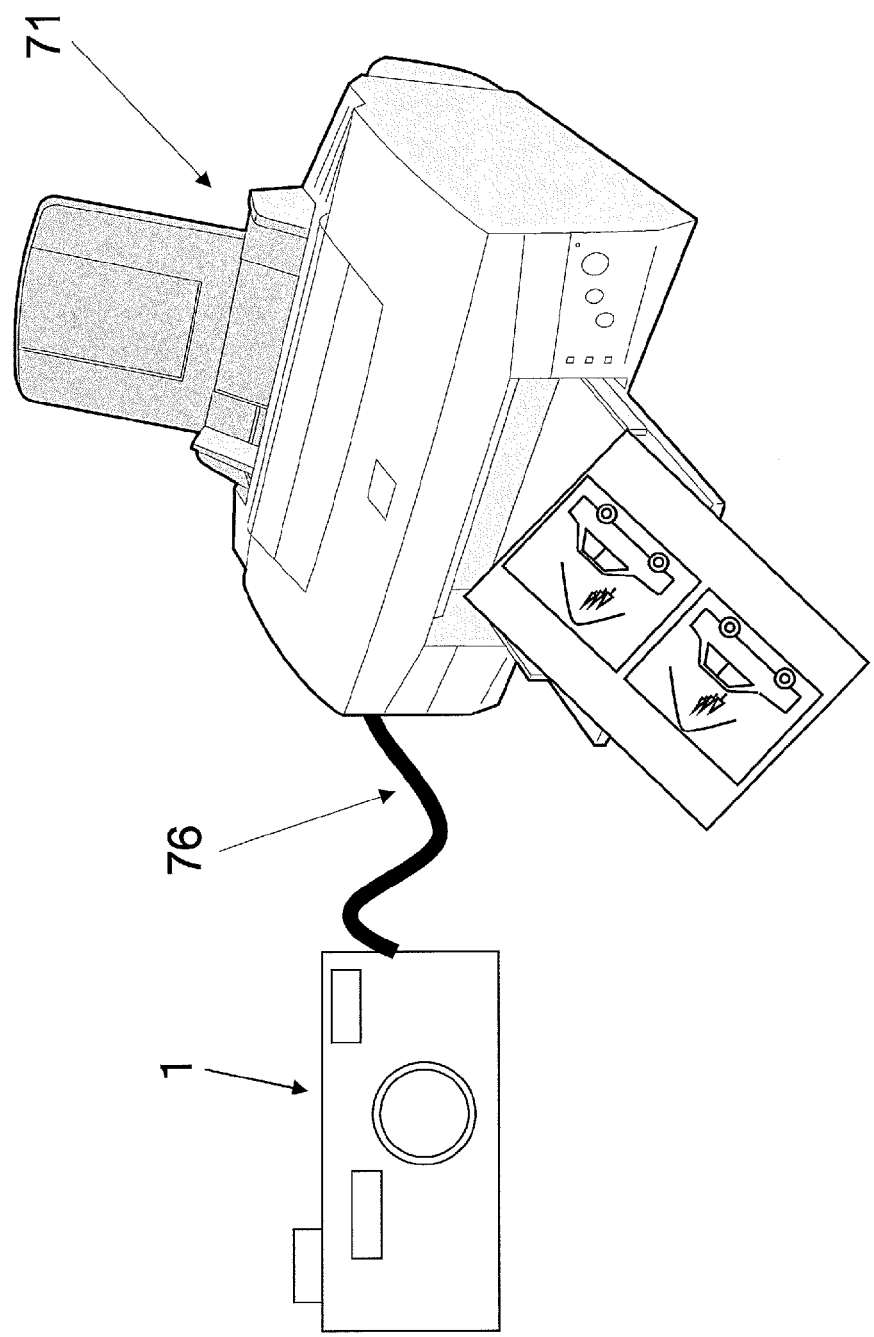
FIG. 31 is a diagram of a digital camera and a printing device (fifth embodiment)

In this case, as shown in FIG. 31, the only difference is that the display device 70 is replaced by the printing device 71, and this embodiment is the same as those given above in that the microcomputer 3 determines the layout of images and the display state on the basis of the panning mode signal 60, the orientation determination signal 61, the movement vector signal 62, or other such information.

Here, the printing device 71 is connected to the digital camera 1 by a cable 76. The layout of images is determined by the microcomputer 3 of the digital camera 1, and the images are displayed on the display unit 55. The images displayed on the display unit 55 are printed on paper by the printing device 71. Consequently, the direction of movement of the digital camera 1 or of movement of the subject can be made to coincide substantially with the layout of images, which reduces any unnaturalness in the printed images.

Furthermore, in this fifth embodiment an external printing device 71 is an example of directly connecting a printer, but other options are also possible. For instance, the connection can be made to a printer via a cable and a personal computer connected to the digital camera 1.

Sixth Embodiment

Figure 32:
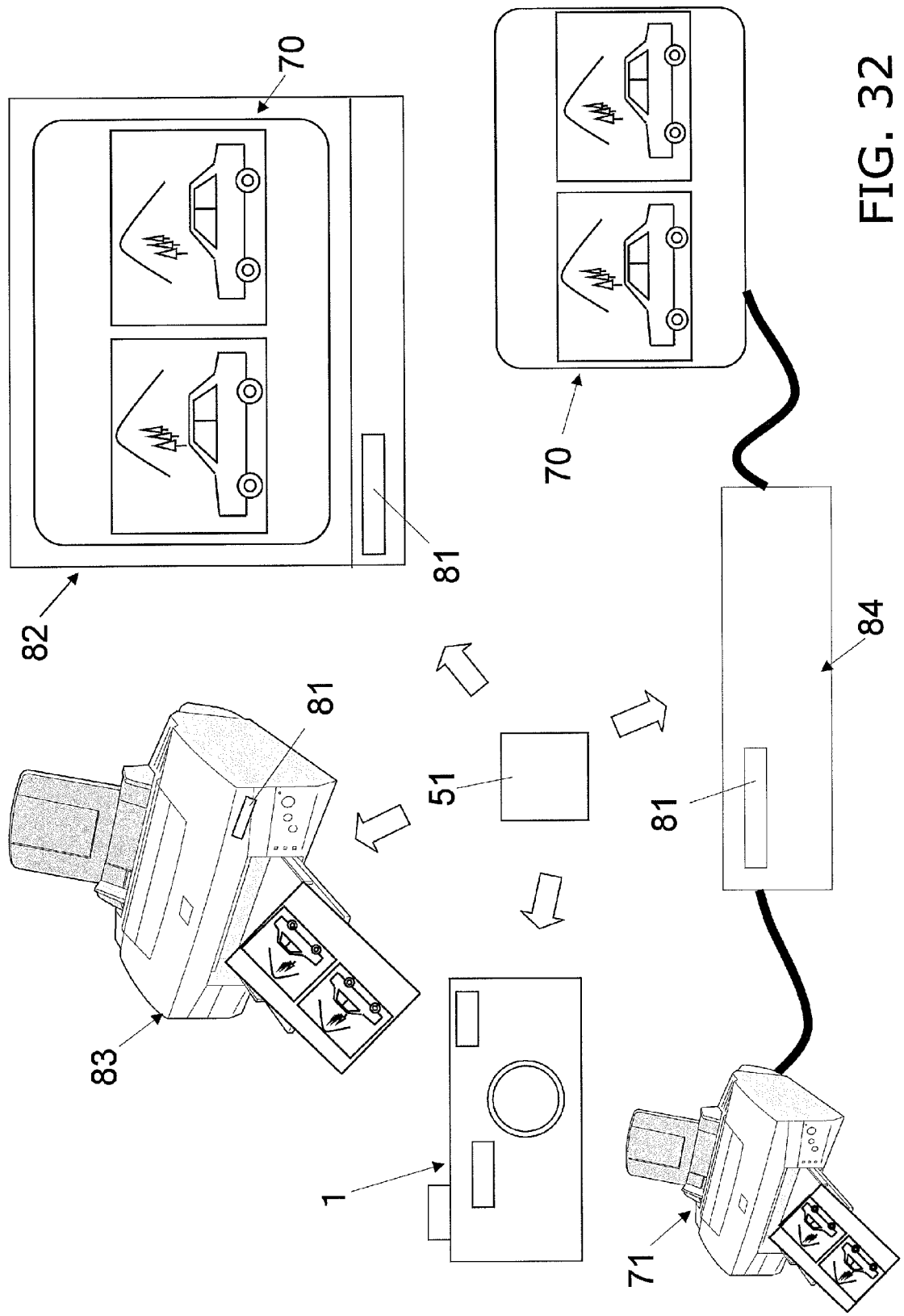
FIG. 32 is a diagram of a display control device, a printing control device, and a display and printing control device (sixth embodiment)

In this case, display control is performed by a display control device 82. More specifically, as shown in FIG. 32, the display control device 82 is a television set, personal computer, or the like equipped with image processing software. Images captured with the digital camera 1 are recorded to a memory card or other such removable memory 51 along with thumbnail images, a orientation determination signal 61, a panning mode signal 60, a movement vector signal 62, and other such information. The removable memory 51 is not limited to being a memory card, and may instead be a hard disk, an optical disk, or the like.

The display control device 82 has a removable memory insertion unit 81 with which information recorded to the removable memory 51 can be read out, and the display device 70 on which images are displayed. The layout of images displayed on the display device 70 is determined on the basis of the panning mode signal 60, the orientation determination signal 61, the movement vector signal 62, or other such information recorded to the removable memory 51, just as in the first embodiment above.

Consequently, with this display control device 82, the direction of movement of the digital camera 1 or of movement of the subject can be made to coincide substantially with the layout of images, which reduces any unnaturalness in the displayed images.

Furthermore, as shown in FIG. 32, the same effect can be obtained when printing is performed with a printing control device 84 equipped with the removable memory insertion unit 81, or when the printing control device 84 is connected to the display device 70 for display, or when printing is performed by connection to the printing device 71.

Also, an example was given of using a display device, printing device, and display and printing control device equipped with the removable memory insertion unit 81, but other options are also possible. For instance, the configuration may be such that a reading device such as a memory card reader with which the removable memory 51 can be read is connected to a display and printing control device, a display device, and a printing device.

Other Embodiments

The specific constitution of the present invention is not limited to the embodiments given above, and various changes and modifications are possible without departing from the gist of the invention.

(1)

With the above embodiments, the digital camera 1 was used to describe a display control device, but the device in which the display control device is installed is not limited to a digital camera, and as long as it is a device with which captured images can be displayed, the installation can be in some other device (such as a digital single lens reflex camera, a digital video camera, a mobile telephone terminal with a camera function, a PDA (personal digital assistant) with a camera function, a PC (personal computer) with a camera function, a DVD (digital video disk) recorder, or a hard disk recorder).

The imaging device can be a device capable of capturing moving pictures, or a device capable of capturing moving pictures and still pictures. Examples of imaging devices besides the above-mentioned digital camera 1 include digital single lens reflex cameras, digital video cameras, mobile telephone terminals with a camera function, PDA's (personal digital assistants) with a camera function, and PC's (person computer) with a camera function.

(2)

In the first embodiment above, the layout of the images was determined by dividing nine types of panning mode signal 60 ("0" to "8") substantially into two groups (to the left, and other). However, when the display unit 55 or other such display section is capable of display in a state in which a plurality of images are laid out diagonally or vertically, the types may be further broken down into smaller groups. By breaking the panning mode signals 60 down into smaller groups, the panning direction or the direction in which the subject is moving can be made to coincide substantially with the time vector formed by the layout of images, which reduces any unnaturalness in the displayed images.

(3)

In the first embodiment, angular velocity signals from the angular velocity sensors 17x and 17y were utilized to detect the panning mode, but signals from the yaw current value detector 14x and the pitch current value detector 14y may be utilized instead of the angular velocity sensors 17x and 17y.

Also, in the first embodiment, the imaging orientation was determined by detecting the current values of both the pitch current value detector 14y and the yaw current value detector 14x, but it is also possible to find the imaging orientation by detecting the current value of just one or the other.

Also, if an abnormality occurs in either the pitch current value detector 14y or the yaw current value detector 14x, the imaging orientation can be accurately determined by detecting the current values of both detectors.

Furthermore, in the first embodiment, the imaging orientation was determined by detecting the current value of pitch and yaw current detectors, but the invention is not limited to this. For instance, the same effect can be obtained by measuring the voltage value.

(4)

In the first and second embodiments, the description was of an example of using a blur correction device for detecting the orientation and the panning mode, but instead, for example, an angular velocity sensor, acceleration sensor, rotational angle detection device, or the like may be attached to a digital camera, so that detection is performed with the digital camera.

Also, in the above embodiments, a single shutter button was provided to the digital camera 1, but instead, for example, a shutter button for imaging in landscape orientation and a shutter button for imaging in portrait orientation may each be provided. In this case, the imaging orientation can be ascertained on the basis of signals from the two shutter buttons.

(5)

In the first and second embodiments, portrait orientation was considered to be one in which the orientation was rotated 90° to the right around the optical axis AX, using the case of landscape orientation as a reference, but the same effect as above can be obtained when portrait orientation is one in which the orientation is rotated 90° to the left. In this case, the orientation determination signal 61 for an orientation rotated 90° to the left is "2," and a total of three kinds of orientation can be detected: one kind of landscape orientation and two kinds of portrait orientation.

(6)

In the first and second embodiments, two kinds of signal, in which the orientation determination signal 61 was "0" or "1," were added to the images, but instead, for example, a signal can be added for just one orientation (such as portrait orientation). Nor is the invention limited to recording the orientation determination signal 61 to an image, and a method may be employed in which the orientation determination signal 61 and the image are recorded to separate files, and the image is associated with the file to which the orientation determination signal 61 is recorded. Similarly, the panning mode signal 60 and the movement vector signal 62 may also be recorded to files separate from the image file, and these files associated with the image.

(7)

When the digital camera 1 is put in portrait orientation in reproduction mode, stacking horizontal images vertically as shown in FIG. 33 will allow the images to be displayed larger than when in the state shown in FIG. 26. Accordingly, the display unit 55 can be utilized more efficiently by detecting the orientation during reproduction mode, and changing the layout of images to vertical if the digital camera 1 is in portrait orientation.

(8)

The embodiments given above can also be combined. For example, the first embodiment and the second embodiment can be combined. More specifically, in the first embodiment, when the vertical and horizontal components of panning are both "none," that is, when the panning mode signal 60 is "0," the digital camera 1 is being held steady. Therefore, it is also conceivable in this case that the movement vector signal 62 is produced from the image, and the layout of the images is determined on the basis of the movement vector signal 62 as in the second embodiment. If the panning mode signal 60 is something other than "0," it is conceivable that the panning mode signal 60 will be given priority.

Also, the camera described above is also realized by a program that functions as the imaging control method for the camera. This program is stored on a recording medium that can be read by a computer.

(9)

In the above embodiments, fewer extracted images than still pictures are produced from a plurality of still pictures forming a moving picture, but instead, all of the plurality of still pictures forming a moving picture may be produced as extracted images.

(10)

In the above embodiments, first movement information related to the movement of the subject in a moving picture was produced, and a plurality of extracted images were produced, on the basis of a moving picture temporarily recorded to a recording section, but another constitution is possible in which separate functions that allow moving pictures and still pictures to be recorded at the same time are utilized, and, for example, the set button 40 is pressed during moving picture imaging to record still pictures along with a moving picture, produce first movement information in the course of this, and produce extracted images.

INDUSTRIAL APPLICABILITY

The teachings described above provide a display control device, imaging device, and printing device with which there is less unnaturalness in a plurality of still pictures displayed side by side. Therefore, the display control device, imaging device, and printing device described above are favorable for devices that can display a plurality of images side by side.

The invention claimed is:

1. A display control device for displaying on a display section an image acquired by an image acquisition section held in a housing, the display control device comprising:
   a recording section configured to record a moving picture formed by a plurality of still pictures continuously acquired by the image acquisition section;
   a movement information production section configured to produce first movement information related to movement of a subject in the moving picture, on the basis of the moving picture recorded to the recording section;
   an extracted image production section configured to produce a plurality of extracted images from the plurality of still pictures forming the moving picture;
   a disposition determination section configured to determine the disposition of the plurality of extracted images on the basis of the first movement information; and
   an image display controller configured to display at least two of the plurality of extracted images side by side on the display section on the basis of the determination result of the disposition determination section.

2. The display control device according to claim 1, wherein the movement information production section is configured to produce the first movement information on the basis of the plurality of extracted images extracted from the moving picture.

3. The display control device according to claim 2, wherein the recording section is configured to record second movement information related to the movement direction of the housing during acquisition of the moving picture, along with the moving picture, and
   the movement information production section is configured to produce the first movement information by utilizing the second movement information.

4. The display control device according to claim 3, further comprising
   an image recording controller configured to control so that the extracted image and the first movement information are associated when recorded to the recording section.

5. An imaging device, comprising:
   a housing;
   an optical system supported by the housing and configured to form an optical image of a subject;
   an image acquisition section configured to convert an optical image formed by the optical system into an electrical image signal, and configured to acquire an image of the subject;
   a display section configured to display side by side a plurality of images acquired by the image acquisition section;
   a movement detector configured to detect the movement direction of the housing; and
   the display control device according to claim 2.

6. The imaging device according to claim 5, further comprising
   an orientation detector configured to acquire orientation information related to the orientation of the housing, wherein
   the orientation information is recorded along with the image to the recording section, and
   the image display controller is configured to adjust the display state of the image with respect to the display section so that in a state in which the image is displayed on the display section, the top-bottom direction in the image substantially coincides with the vertical direction.

7. The display control device according to claim 1, wherein the disposition determination section is configured to determine the disposition of the plurality of extracted images so that the orientation of the time vector formed by two adjacent extracted images will substantially coincide with one component of the direction of movement included in the first movement information.

8. The display control device according to claim 7, wherein the recording section is configured to record second movement information related to the movement direction of the housing during acquisition of the moving picture, along with the moving picture, and
   the movement information production section is configured to produce the first movement information by utilizing the second movement information.

9. The display control device according to claim 8, further comprising
   an image recording controller configured to control so that the extracted image and the first movement information are associated when recorded to the recording section.

10. The display control device according to claim 1, wherein
    the recording section is configured to record second movement information related to the movement direction of the housing during acquisition of the moving picture, along with the moving picture, and
    the movement information production section is configured to produce the first movement information by utilizing the second movement information.

11. The display control device according to claim 1, further comprising
    an image recording controller configured to control so that the extracted image and the first movement information are associated when recorded to the recording section.

12. An imaging device, comprising:
    a housing;
    an optical system supported by the housing and configured to form an optical image of a subject;
    an image acquisition section configured to convert an optical image formed by the optical system into an electrical image signal, and configured to acquire an image of the subject;
    a display section configured to display side by side a plurality of images acquired by the image acquisition section;
    a movement detector configured to detect the movement direction of the housing; and
    the display control device according to claim 1.

13. The imaging device according to claim 12, further comprising
   an orientation detector configured to acquire orientation information related to the orientation of the housing, wherein
   the orientation information is recorded along with the image to the recording section, and
   the image display controller is configured to adjust the display state of the image with respect to the display section so that in a state in which the image is displayed on the display section, the top-bottom direction in the image substantially coincides with the vertical direction.

14. The imaging device according to claim 13, further comprising
   a blur correction device configured to suppress deterioration of an image caused by movement of the housing, wherein
   the blur correction device has a correcting lens included in the optical system, a drive frame supporting the correcting lens movably in a first direction perpendicular to the optical axis of the correcting lens and a second direction that is perpendicular to the first direction and the optical axis, a first actuator configured to drive the correcting lens in the first direction, and a second actuator configured to drive the correcting lens in the second direction, and
   the orientation detector is configured to detect the orientation of the housing on the basis of the drive force of the first actuator and second actuator.

15. The imaging device according to claim 12, further comprising
   a recording controller configured to associate mutually and configured to record the plurality of extracted images selected from the moving picture.

16. A printing device, comprising:
   the display control device according to claim 1; and
   a printing section configured to print an image displayed on the display section.

17. The display control device according to claim 2, wherein
   the disposition determination section is configured to determine the disposition of the plurality of extracted images so that the orientation of the time vector formed by two adjacent extracted images will substantially coincide with one component of the direction of movement included in the first movement information.

18. The display control device according to claim 17, wherein
   the recording section is configured to record second movement information related to the movement direction of the housing during acquisition of the moving picture, along with the moving picture, and
   the movement information production section is configured to produce the first movement information by utilizing the second movement information.

19. The display control device according to claim 18, further comprising
   an image recording controller configured to control so that the extracted image and the first movement information are associated when recorded to the recording section.

20. The display control device according to claim 2, further comprising
   an image recording controller configured to control so that the extracted image and the first movement information are associated when recorded to the recording section.

* * * * *